United States Patent [19]

Hunt et al.

[11] 4,031,400

[45] June 21, 1977

[54] X-RAY SOFT FILMER

[75] Inventors: Robert P. Hunt, Chesterland; Robert J. Steffek, Wickliffe, both of Ohio

[73] Assignee: Picker Corporation, Cleveland, Ohio

[22] Filed: Oct. 7, 1974

[21] Appl. No.: 512,998

[52] U.S. Cl. .............................. 250/468; 250/471; 271/3; 271/164

[51] Int. Cl.² ...................... B65H 5/22; G11B 1/00

[58] Field of Search ................ 271/3, 4, 145, 164, 271/DIG. 169; 250/468, 471

[56] References Cited

UNITED STATES PATENTS

| | | | |
|---|---|---|---|
| 3,173,010 | 3/1965 | Barrett et al. | 250/471 |
| 3,828,196 | 8/1974 | Mika et al. | 250/468 |

FOREIGN PATENTS OR APPLICATIONS 2,031,386  1/1972  Germany

*Primary Examiner*—Alfred E. Smith
*Assistant Examiner*—T. N. Grigsby

*Attorney, Agent, or Firm*—Watts, Hoffmann, Fisher & Heinke Co.

[57] ABSTRACT

An X-ray apparatus includes a spot filmer for feeding sheets of unexposed film one at a time into a vacuum evacuable assembly for exposure, and for returning exposed film sheets to an exposed film magazine. The spot filmer has a housing defining a light tight enclosure. The film magazines are insertable through a door into the housing and into a film feed mechanism. The film feed mechanism unlatches, opens and positions the magazines; feeds a sheet of unexposed film into the vacuum evacuable assembly; releases the film sheet so the assembly can position the film sheet for exposure; and closes the film magazines. An orthogonal drive system positions the vacuum evacuable assembly to expose selected film sheet portions, and returns the assembly to a retracted position. The film feed mechanism opens the magazines; feeds the exposed film sheet into the exposed film magazine; and closes the magazines. The structures of these several mechanisms are described.

43 Claims, 31 Drawing Figures

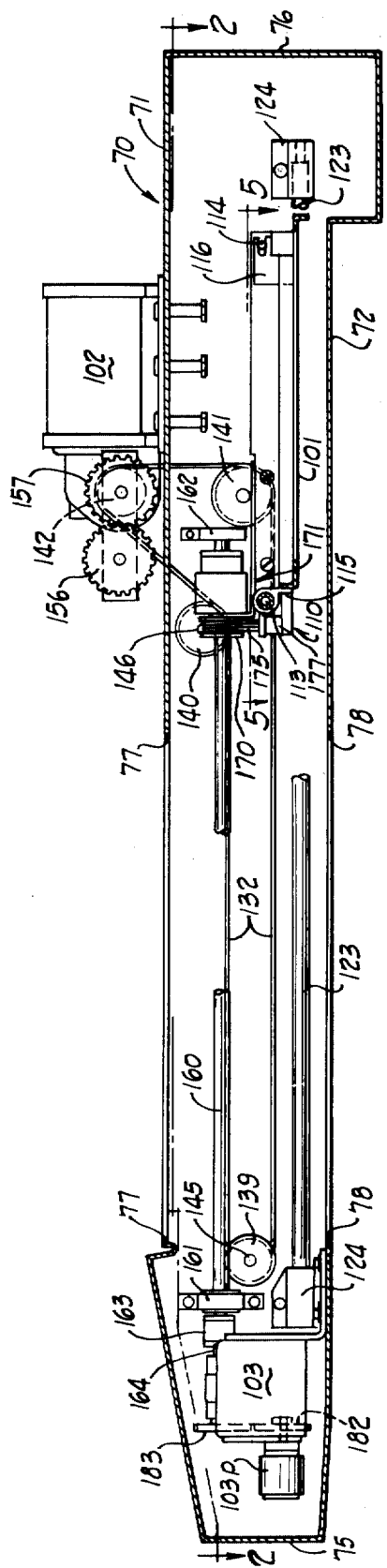

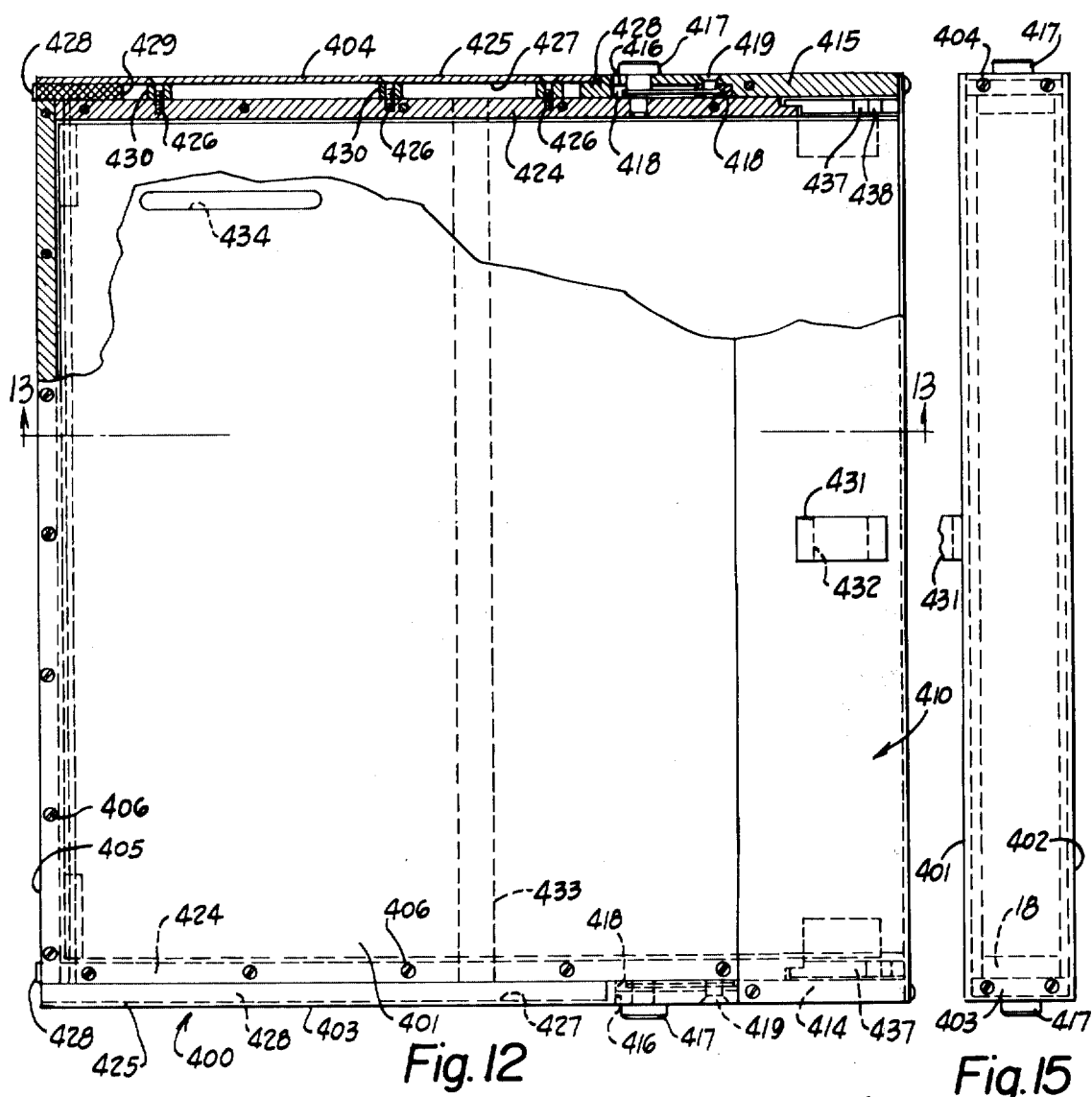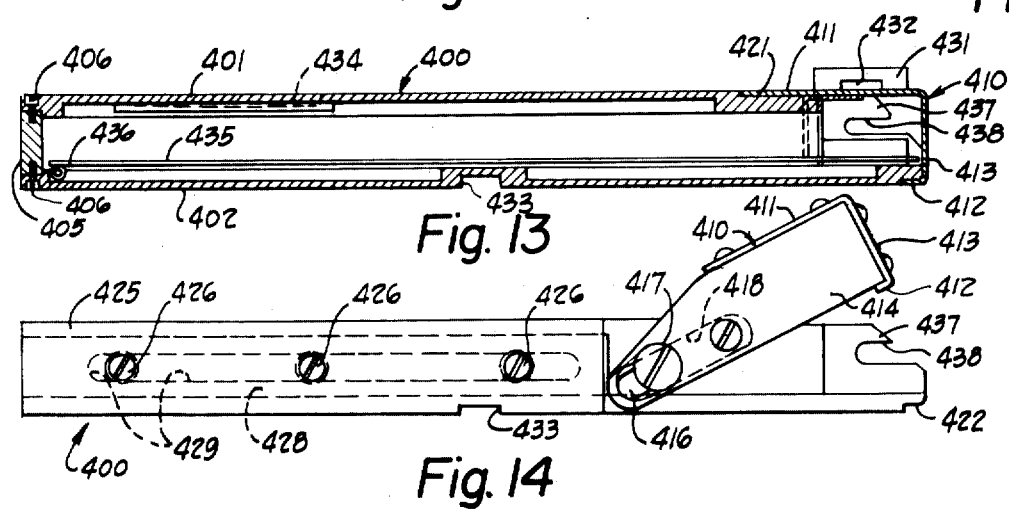

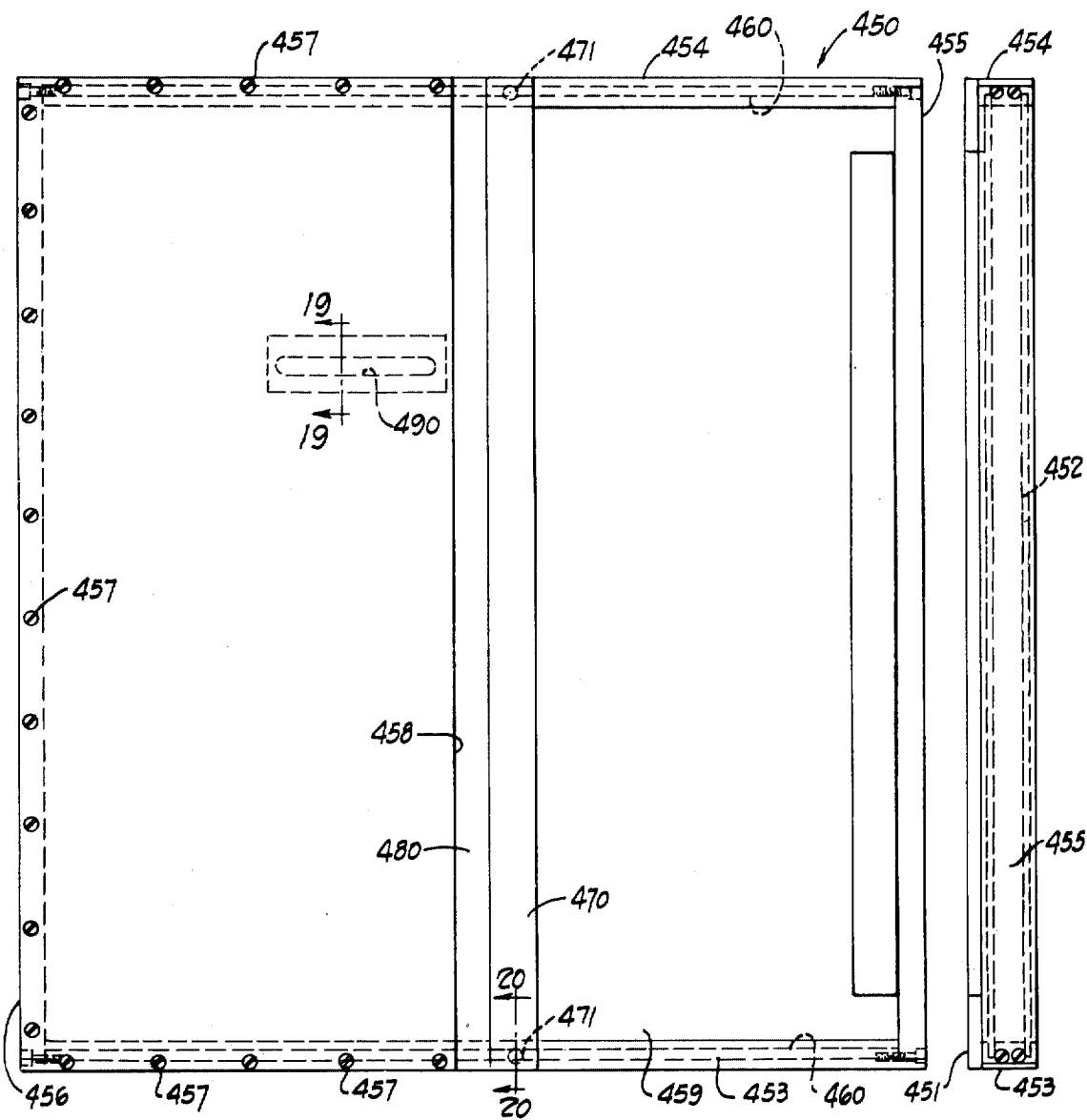
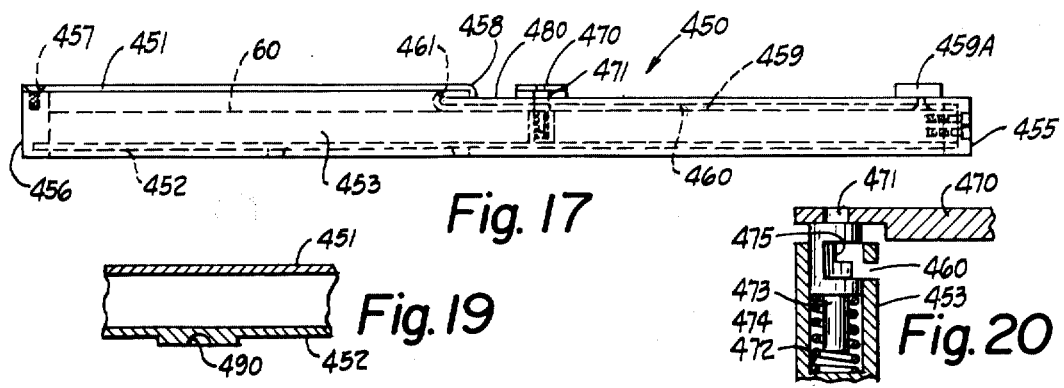
Fig. 16  Fig. 18
Fig. 17
Fig. 19  Fig. 20

X-RAY SOFT FILMER

REFERENCE TO RELATED AND RELEVANT PATENTS AND APPLICATIONS

X-RAY SPOT FILMER, Ser. No. 512,997 filed Oct. 7, 1974 now abandoned by Edward Slagle, here the "Film Handling Patent". X-RAY SPOT FILMER, Ser. No. 512,974 filed Oct. 7, 1974 now Pat. No. 3,989,950 by Robert P. Hunt and Eugene V. Brinkman, here the "System Patent".

X-RAY TABLE, Ser. No. 320,142 filed Jan. 2, 1973, by Cecil K. Bridgeman, as a continuation of Ser. No. 93,268, filed Nov. 27, 1970, now U.S. Pat. No. 3,891,850 issued June 24, 1975, here the "Cassetteless System Patent".

X-RAY APPARATUS INCLUDING COUNTERBALANCING MECHANISM, Ser. No. 508,176, filed Sept. 23, 1974, as a continuation of application, Ser. No. 656,448, filed July 27, 1967 by Edwin A. Norgren, now U.S. Pat. No. 3,916,203 issued Oct. 28, 1975, here the "Tiltable Table Patent".

AUTOMATIC SHUTTER CONTROL FOR AN X-RAY SPOT FILMER, U.S. Pat. No. 3,502,872, issued Mar. 24, 1970 to Edwin A. Norgren, here the "Shutter Control Patent".

BACKGROUND OF THE INVENTION

1. Field of the Invention

The present invention relates generally to X-radiography and more particularly to a novel and improved X-ray spot filmer system of the type movably carried on the tower of a tiltable X-ray table for the taking of radiographs.

2. Prior Art

In X-ray examinations, it is now well known to provide a table body tiltably carried on a pedestal for supporting a patient in a selected horizontal, vertical, or inclined attitude during the taking of radiographs. An X-ray source is supported on a carriage in the table body and is movable longitudinally of the table. A tower assembly is coupled to the carriage and moves with the X-ray source along the table body. The tower assembly includes an up-standing tower structure for supporting X-ray imaging equipment at selected positions above the table top. An X-ray table of this type is described in the referenced Tiltable Table Patent.

If the physician wishes to take still pictures in the form of radiographs, an imaging device called a spot filmer is used. The spot filmer presents a sheet of film at an exposure station in the path of X-ray emission from the X-ray source carried in the table body. Spot filmers in present-day use include an automatic shutter mechanism and a carriage system for moving a sheet of film to different positions within the exposure station to selectively expose the entire film sheet or to sequentially expose selected portions of the film sheet. A spot filmer including a shutter mechanism of this type is described in the referenced Shutter Control Patent.

Prior spot filmers utilize cassette-carried film. Each sheet of film is carried in a separate cassette. The spot filmer has a movable carriage which will receive and position one film cassette for exposure. When the exposure is complete, the exposed film cassette is removed from the spot filmer and a cassette containing an unexposed film sheet is inserted into the carriage for subsequent exposure.

The use of cassettes has a significant number of disadvantages, including:

a. The cassettes must be loaded individually in darkness, transported to the X-ray room where they will be exposed, and returned to a dark environment for unloading and developing. This individual handling of film sheets and relatively heavy cassettes is time consuming, cumbersome and expensive.

b. A large number of cassettes are required in hospitals and the like where a plurality of X-ray rooms are in use and each must be supplied with cassetted film.

c. The handling of cassettes during the taking of a series of radiographs is awkward and time consuming. Moreover, each of the films must be identified to assure that the radiographs are not confused with those of another patient.

d. The cassettes must be handled carefully to prevent the entrance of light and to prevent exposure by scatter radiation. When stored in an X-ray room, the cassettes require a radiation shielded enclosure.

e. Poor or unusable radiographs can result due to failure or weakening or improper positioning of the cassette springs which clamp the film sheet between a pair of intensifying screens. This problem may necessitate if a radiograph is unusable, it is necessary to return a patient to the radiographic table to repeat part or all of a radiographic film series.

In the past there have been proposals in various types of X-ray apparatus other than spot filmers for eliminating the use of cassettes in an effort to obviate cassette-related problems. Such proposals have called for the use of separate film storage magazines for holding exposed and unexposed film sheets. Unexposed film sheets are fed, one at a time from an unexposed film magazine to an exposure station. Exposed film sheets are fed from the exposure station to an exposed film magazine.

The referenced "Cassetteless System Patent" describes a system where film sheets of different sizes are carried in different sized storage magazines and are selectively fed to an exposure station. After exposure, the film sheets are delivered to a common exposed film station. The described system utilizes a vacuum source to attain thorough, intimate contact between a film sheet and a pair of intensifier screens.

Spot filmer installations present a number of unique problems that militate against the use of prior cassetteless film handling systems in a spot filmer.

One such problem relates to counterbalancing. Since a spot filmer is movably supported on the movable tower of a tiltable X-ray table, its weight and the weight of its supporting tower must be carefully counterbalanced to permit the spot filmer and the tower to move easily regardless of the angle of inclination of the tiltable table top. The need for counterweighting necessitates that spot filmer weight be minimized. Moreover, as is explained in the referenced "Tiltable Table Patent", prior to the invention described and claimed there each kilogram of spot filmer weight requires not one but 3 kilograms of counterbalance weight. Hence, each kilogram of spot filmer weight imposes an added 4 kilogram load to the table. This added load necessitates the further strengthening of the table and as the table design is strengthened, still more weight is added.

In short, even a small amount of excessive spot filmer weight presents very significant design problems. Since prior cassetteless film systems have been designed for use in under-the-table installations, in chest units and the like where the weight of the system has not posed a real problem, prior systems are typically too heavy for use in a spot filmer installation.

Still another problem that is peculiar to spot filmer film handling systems is that only limited amount of space is available for the filmer. A modern X-ray room is equipped with a ceiling mounted X-ray source and other equipment that is used both with and in the vicinity of the X-ray table. In order to permit proper use of such equipment, the spot filmer must be of limited size and must be parkable at an out-of-the way position when not in use. Prior cassetteless film feed systems are not well adapted for spot filmer use inasmuch as they are too cumbersome and bulky.

SUMMARY OF THE INVENTION

The present invention overcomes the foregoing and other drawbacks of the prior art by providing a spot filmer of compact, relatively light weight construction which is operable to effect a rapid, fully automatic feeding and positioning of film sheets during the taking of one or a series of radiographs.

The spot filmer has a housing forming a light tight enclosure. The housing defines a chamber of L-shaped cross section having a first, relatively narrow elongated region which communicates near one end with a second, relatively wide region. A vacuum evacuable assembly is movably carried in the first region. A film feed mechanism is carried in the second region.

An orthogonal drive system is provided with separate X-and Y-direction drive motors for moving the vacuum evacuable assembly from a retracted position near the second region to an exposure station in the first region. The drive motors are servocontrolled to position the vacuum evacuable assembly in selected positions for exposing all or a sequence of portions of a film sheet carried in the assembly.

The vacuum evacuable assembly includes a relatively rigid vacuum plate and a relatively flexible base plate. A pair of X-radiation sensitive intensifier screens are carried between the vacuum plate and the base plate. One of the screens is secured to the base plate. The other screen is secured to the vacuum plate.

The vacuum plate has a perimetrical groove which extends perimetrically around its intensifier screen. A vacuum seal is carried in this groove. The base plate intensifier screen is dimensionally larger than the vacuum plate screen and is engaged by the vacuum seal. A vacuum evacuation passage is formed in the vacuum plate for vacuum evacuating the chamber defined between the intensifier screens, whereby ambient air pressure forces acting against the vacuum and base plates are utilized to establish intimate screen-to-film contact between the intensifier screens and a film sheet positioned between the screens.

The vacuum evacuable assembly is configured such that when a standard size square sheet of spot filmer film is positioned in the vacuum assembly, a marginal edge region or "lip" of the film extends outside the assembly. This film lip is used for two purposes. One function of the film lip is to provide a film sheet portion which can be easily grasped by the film feed mechanism when the vacuum evacuable assembly is in its retracted position. A second function of the film lip is to provide a film sheet portion where an identification image can be formed to identify the film with a patient's name or identification number.

A film identification system including a light source, and an optical system is provided. An identification card bearing patient identification indicia is insertable into a cover carried on the spot filmer housing. When a film sheet is positioned in the vacuum evacuable assembly, the light source is flashed on to illuminate the identification indicia. An optical system including two mirrors and a lens forms an image of the indicia on the film lip.

A pair of openings are formed through one side of the spot filmer housing to admit a pair of film magazines to the film feed mechanism carried in the second region of the housing. A power-operated guillotine-like door is provided for opening and closing the openings.

The film magazines are of different construction, one being adapted to carry and dispense sheets of unexposed film, and the other being adapted to receive and carry sheets of exposed film. Each of the magazines is provided with a movable cover that is latched in place when the magazines are removed from the film feed mechanism.

The film feed mechanism includes several power operated subassemblies which are operable to:

1. Engage the film magazines when they are being inserted through the housing openings and pull the magazines into the film feed mechanism;
2. Unlatch, open, and extend the magazines to positions where a sheet of unexposed film can be fed out of the unexposed film magazine and a sheet of exposed film can be fed into the exposed film magazine;
3. Feed film sheets one at a time from the unexposed film magazine to the vacuum evacuable assembly and close the magazines once such feeding has taken place;
4. Re-open the magazines to receive a sheet of exposed film, feed the exposed film sheet from the vacuum evacuable assembly into the exposed film magazine, and close the magazines; and
5. Open the door and eject the film magazines.

The two referenced concurrently filed cases relate to various aspects of the spot filmer and its operation. The lines of demarcation between these several cases exist principally due to the fact that different people and groups of people contributed inventive concepts during the overall development.

Certain basic concepts of the system were conceived initially by one inventor, and these concepts form the subject of the referenced Film Handling Patent. Certain additional concepts relating to the arrangement and operation of the spot filmer components were conceived jointly by two inventors, and these form the subject of the referenced System Patent. Certain other concepts relating to the structure and operation of the several components which form the spot filmer were conceived jointly by two inventors, and these form the subject of the present case.

Some of the features to which the present case relate are the structures of the unexposed and exposed film magazines, the vacuum evacuable assembly, the assembly positioning system, the film feed mechanism and the several operational components of the film feed mechanism, all of which cooperate to provide a compact, lightweight spot filmer capable of taking a rapid sequence of radiographs.

As will be apparent from the foregoing summary, it is a general object of the present invention to provide a novel and improved X-ray spot filmer.

Other objects and a fuller understanding of the invention may be had by referring to the following description and claims taken in conjunction with the accompanying drawings.

BRIEF DESCRIPTION OF THE DRAWINGS

FIG. 3 is a sectional view as seen from the plane indicated by the line 3—3 in FIG. 2;

FIG. 4 is an enlarged sectional view as seen from the plane indicated by the line 4—4 in FIG. 2;

FIG. 12 is a top plan view of an unexposed film magazine used in the apparatus of FIG. 1 common portions of the magazine being broken away and shown in cross-section to illustrate detail;

FIG. 13 is a sectional view as seen from the plane as indicated by the line 13—13 in FIG. 12;

FIG. 14 is a side elevational view of the film magazine of FIG. 12;

FIG. 15 is an end elevational view of the film magazine of FIG. 12;

FIG. 16 is a top plan view of an exposed film magazine used in the apparatus of FIG. 1;

FIG. 17 is a side elevational view of the film magazine of FIG. 16;

FIG. 18 is an end elevational view of the film magazine of FIG. 16;

FIGS. 19 and 20 are enlarged sectional views as seen from the planes indicated by the lines 19—19 and 20—20 in FIG. 16;

DESCRIPTION OF THE PREFERRED EMBODIMENT

I. The Table 40

Figure 1:
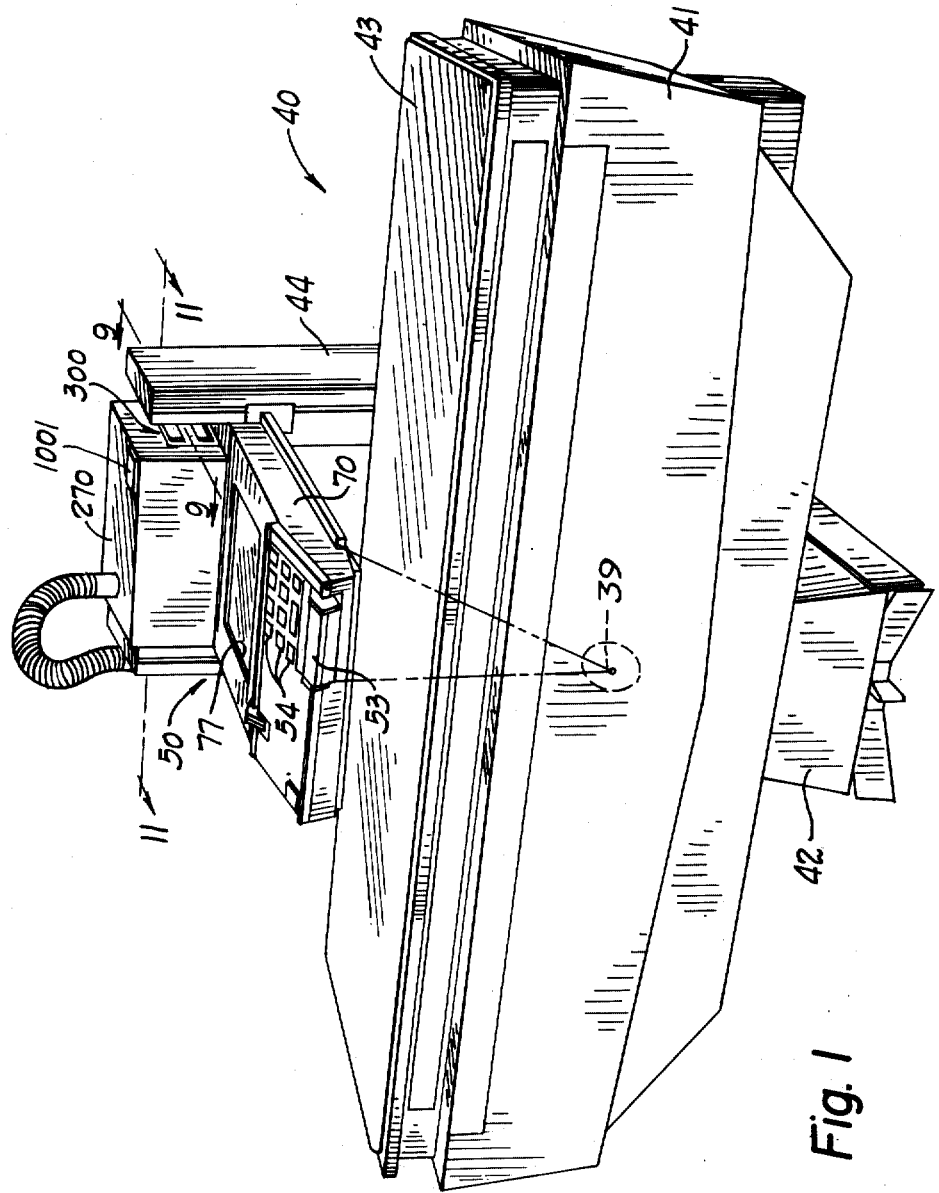
FIG. 1 is a perspective view of an X-ray apparatus embodying the present invention.

Referring to FIG. 1, an X-ray table is shown generally at 40. The table 40 includes a body 41 tiltably on a pedestal 42. A table top 43 is defined by the body 41 for supporting a patient. An X-ray source, indicated schematically by the numeral 39, is movably carried within the table body 41.

An upstanding tower 44 is carried by the body 41 for movement longitudinally of the table top 43. A spot filmer 50 is carried on the tower 44 for movement in a first orthogonal direction toward and away from the table top 43, and in a second orthogonal direction forwardly and rearwardly between a parked position over portions of the tower 44 to an operating position forward of the tower 44 shown in FIG. 1. Counterweights (not shown) are included in the body 41 and in the tower 44 to facilitate the movement of the tower 44 and the spot filmer 50 regardless of the orientation of the tiltable body 41. One such table including a tower and counterweighting is described in the referenced Tiltable Table Patent.

II. An Overview of the Spot Filmer 50

The spot filmer 50 includes a lower housing 70 and an upper housing 270. A handle 53 is provided near the forward end of the lower housing 70 to facilitate moving the spot filmer between parked and operational positions. A number of control buttons 54 are provided in the usual manner near the handle 53 to control the operation of the spot filmer 50 and to effect the taking of one or a predetermined series of radiographs.

Figure 5:
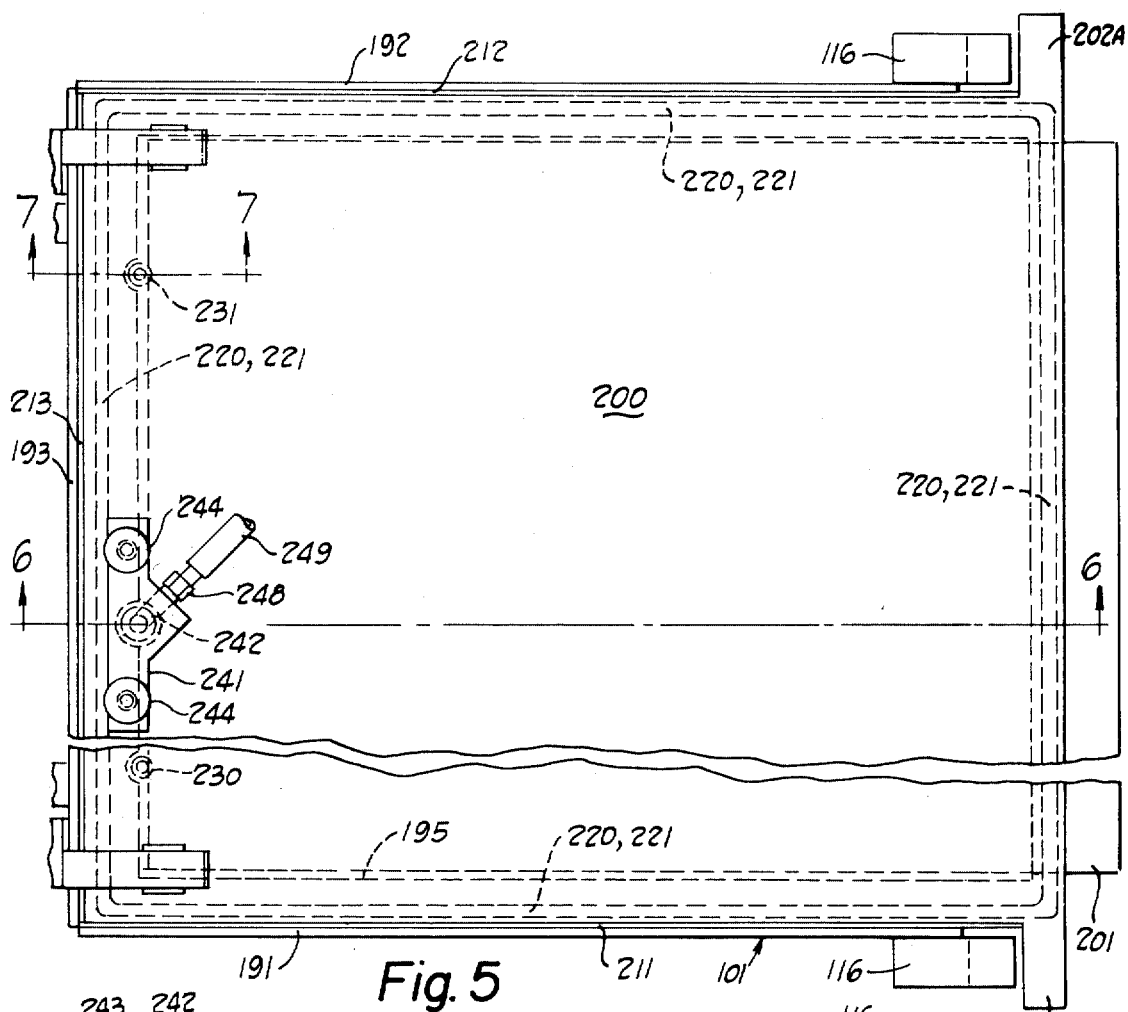
FIG. 5 is an enlarged top plan view of the vacuum evacuable assembly shown in FIG. 2.

The structure and operation of the several components of the spot filmer 50 will be described in detail in the sections which follow. As will be described in these sections, the lower housing 70 movably carries a vacuum evacuable film assembly 200 (FIG. 5). The housing 270 encloses a film feed mechanism 500 (FIGS. 22-30). A door assembly 300 (FIG. 9) is provided on the upper housing 270. An unexposed film magazine 400 (FIG. 12) and an exposed film magazine 450 (FIG. 16) are insertable through the door assembly 300 into the film feed mechanism 500.

In operation, the film feed mechanism 500 feeds a sheet of film from the unexposed film magazine 400 into the vacuum evacuable assembly 200 while the assembly 200 is in a retracted position. The assembly 200 then moves to an exposure station where the film sheet is exposed. After exposure, the assembly 200 returns to its retracted position. The feed mechanism 500 feeds the exposed film sheet out of the assembly 200 and into the exposed film magazine 450.

III. The Lower Housing 70

Figure 2:
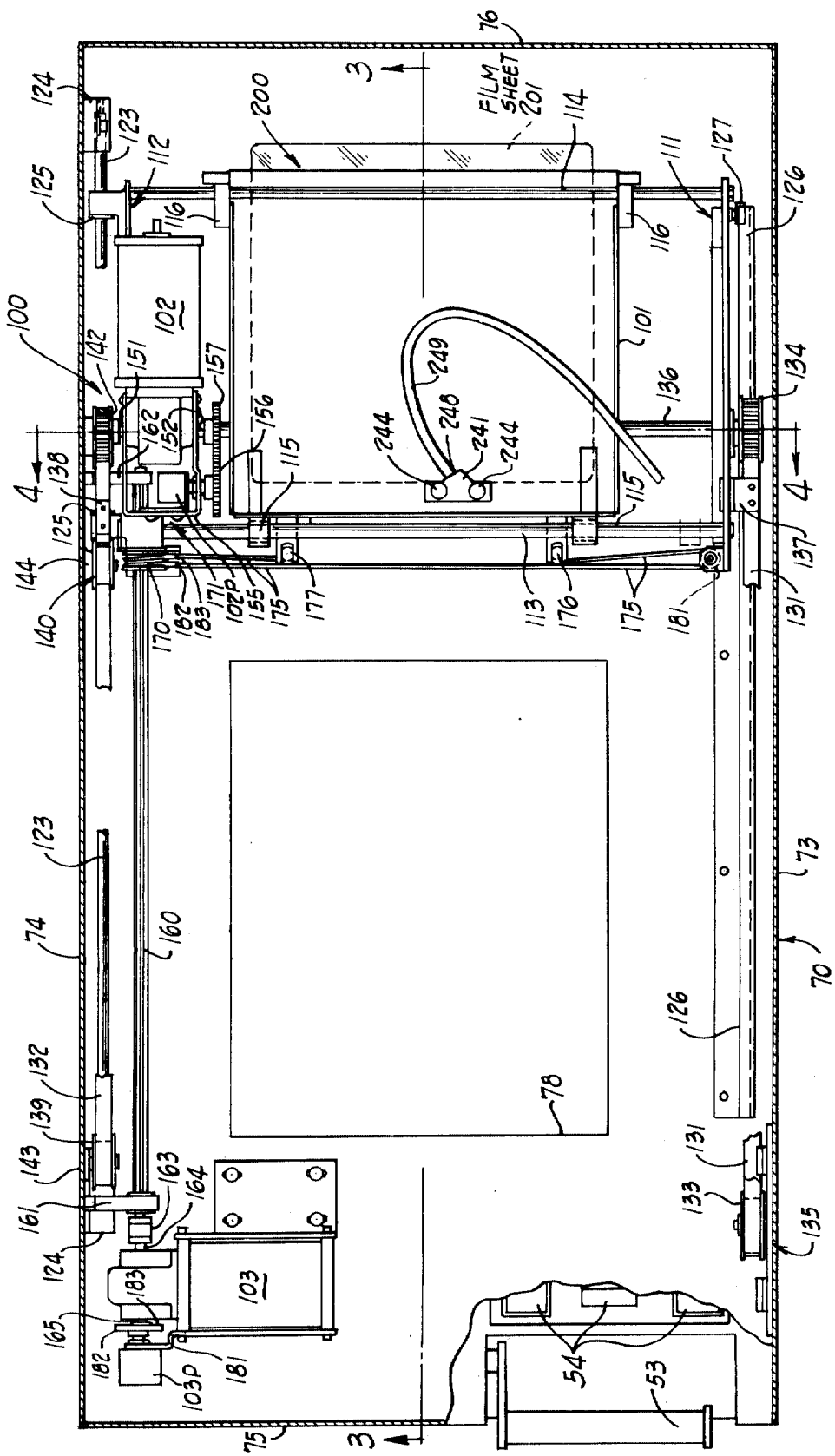
FIG. 2 is an enlarged top plan view of a portion of the apparatus of FIG. 1 with other portions removed, the view being seen from the plane indicated by the broken line 2—2 in FIG. 3.

Referring to FIGS. 2-4, the lower housing 70 has spaced top and bottom walls 71, 72 interconnected by a pair of sidewalls 73, 74 a front wall 75, and a rear wall 76. Aligned rectangular openings 77, 78 are formed through the top and bottom walls 71, 72. When the spot filmer 50 is in an operational position, the openings 77, 78 are positioned along the path of emission of X-rays from the X-ray source carried in the table body 41.

The opening 77 in the top wall 71 is provided to accommodate such conventional dynamic camera equipment and image intensifying devices as are commonly used in some X-ray examinations.

The opening 78 in the bottom wall 72 receives X-radiation which has passed through portions of a patient. An automatic shutter unit (not shown) of the type described in the referenced Shutter Control Patent is provided within the housing 70 adjacent the opening 78 to selectively shield portions of a film sheet being exposed by the spot filmer. Such a shutter system permits a sheet of film supported in the vacuum evacuable assembly 200 to be exposed a quadrant at a time, a half at a time, or all at once.

IV. The Cassette Positioning System 100

Referring to FIG. 2, an orthogonal drive system, indicated generally by the numeral 100, is provided to position the vacuum evacuable assembly 200 within the lower housing 70. The assembly 200 is supported on a tray 101. The orthogonal drive system 100 positions the tray 101 longitudinally and laterally within the housing 70.

Longitudinal movement of the tray 101 within the lower housing 70 will be called X-direction movement. A reversible drive motor 102 is provided to effect X-direction movement. Lateral movement of the tray 101 within the lower housing 70 will be called Y-direction movement. A reversible drive motor 103 is provided to effect Y-direction movement. Referring to FIG. 3, the X-direction drive motor 102 is carried atop the top wall 71 of the lower housing 70 at a position which will not interfere with lateral of Y-direction movement of the tray 101. The Y-direction drive motor 103 is carried within the lower housing 70 at a position forwardly of the range of X-direction travel of the tray 101.

A carriage 110 is provided within the lower housing 70 to support the tray 101. The carriage 110 is a rigid, generally rectangular framework, including a pair of side bracket assemblies 111, 112 and a pair of support rods 113, 114. The support rods 113, 114 have opposite ends secured to the bracket assemblies 111, 112. The support rods 113, 114 extend laterally of the lower housing 70 in parallel spaced relationship between the bracket assemblies 111, 112.

The tray 101 is supported for lateral, Y-direction movement on the carriage rods 113, 114. A pair of forward bearing blocks 115 and a pair of rearward bearing blocks 116 are carried by the tray 101. The forward bearing blocks 115 carry bushings which slidably journal the forward carriage rod 113. The rearward bearing blocks 116 are slotted, as best seen in FIG. 3, to slidably receive the rearward carriage rod 114.

The carriage 110 is supported for longitudinal, X-direction movement within the lower housing 70. A guide rod 123 extends longitudinally along one side of the lower housing 70. A pair of brackets 124 secure opposite ends of the guide rod 123 to the housing sidewall 74. A pair of bushings 125 carried by the carriage side bracket assembly 112 slidably journal the guide rod 123. A trackway 126 of C-shaped cross-section is carried by the housing bottom wall 72 for supporting the opposite side of the carriage 110. A pair of neoprene rubber covered rollers 127 carried on the carriage side bracket assembly 111 are positioned in the C-shaped trackway 126.

A pair of toothed timing belts 131, 132 have reaches which extend along opposite sides of the X-direction path of travel of the carriage 110. A pair of brackets 137, 138 are connected to the carriage side brackets 111, 112 and are secured to the belts 131, 132, respectively.

The belt 131 is reeved around a pair of timing belt pulleys 133, 134. An adjustable mounting bracket 135 mounts the pulley 133 on the housing sidewall 73 permitting the pulley 133 to function as a tensioning device for the belt 131. The belt 132 is reeved around four timing belt pulleys 139, 140, 141, 142. A pair of brackets 143, 144 carry stub shafts 145, 146 and mount the pulleys 139, 140 on the housing sidewall 74.

The pulleys 134, 141 are secured to opposite end regions of a shaft 136, as best seen in FIG. 4. A pair of ball bearings 147, 148 are carried by the housing sidewalls 73, 74 and journal opposite ends of the shaft 136. The pulleys 134, 141 are secured to the shaft 136 at positions inwardly of the bearings 147, 148.

The X-direction drive motor 102 drives the timing belt 132. The motor 102 has a drive shaft, opposite end regions of which are designated by the numerals 151, 152 in FIG. 2. The pulley 142 is mounted on the shaft end region 151. When the motor 102 rotates the pulley 142, the interconnected timing belts 131, 132 move the carriage 110 along the guide rod 123 and the trackway 126. When the motor 102 drives the pulley 142 in a forward direction of rotation, the carriage 110 moves forwardly within the housing 70. Reverse rotation of the pulley 142 moves the carriage 110 rearwardly.

A potentiometer 102P is provided to monitor the X-direction positioning of the carriage 110. A bracket 155 mounts the potentiometer 102P at a location near the motor 102. The potentiometer 102P has a rotatable stem which carries a gear 156. A gear 157 is secured to the drive shaft end region 152 and meshes with the gear 156. When the motor 102 drives the pulley 142, the potentiometer 102P provides a variation in an electrical signal indicative of the position of the carriage 110 along the guide rod 123 and trackway 126.

A splined shaft 160 extends longitudinally within the housing 70 along the sidewall 74. A pair of bearing blocks 161, 162 are mounted on the sidewall 74 and journal opposite end regions of the splined shaft 160.

The Y-direction drive motor 103 drives the splined shaft 160. The motor 103 has a drive shaft, opposite end regions of which are designated by the numerals 164, 165 in FIG. 2. A flexible coupling 103 drivingly connects the drive shaft end 164 and the splined shaft 160.

A cable drum 170 is rotatably carried on the carriage 110. A bracket assembly 171 is secured to the carriage side bracket 112 and rotatably mounts the drum 170. The drum 170 has a splined central bore which drivingly engages the splined shaft 160. The drum 170 slides along the splined shaft 160 as the carriage 110 moves in X-direction longitudinally of the housing 70.

A cable 175 is reeved around the drum 170 and connects with the tray 101. The cable 175 moves the tray 101 laterally in Y-directions in response to rotation of the splined shaft 160 by the motor 103. A pair of cable take-up brackets 176, 177 are secured to the tray 101. Opposite ends of the cable 175 are secured to the brackets 176, 177. Three cable idler pulleys 181, 182, 183 are mounted on the carriage 110. The pulley 181 is supported on the carriage side bracket assembly 111. The pulleys 182, 183 are supported side-by-side on the carriage side bracket assembly 112. The cable 175 has a first reach extending from the take-up bracket 176 to the pulley 181, a second reach reeved around the pulley 181, and a third reach extending between the pulleys 181, 182. A fourth reach of the cable 175 is reeved around the pulley 182, around the drum 170, and then around the pulley 183. A remaining fifth reach of the cable 175 extends from the pulley 183 to the take-up bracket 177.

When the splined shaft 160 is rotated by the Y-direction drive motor 103 in one drive direction, the cable 175 moves the tray 101 in one Y-direction along the carriage rods 113, 114. Reverse rotation of the splined shaft 160 moves the tray 101 in the opposite Y-direction.

Accurate Y-direction positioning of the assembly 200 at opposite ends of travel along the rods 113, 114 is achieved by driving the tray 101 to a position where one of the sides of the tray 101 engages resilient stops (not shown) carried on the carriage side members 111, 112. The tray 101 is maintained in engagement with these stops by supplying a reduced voltage to the Y-direction drive motor that is sufficient to bias the tray into engagement with the stops.

A potentiometer 103P is provided to monitor the Y-direction positioning of the tray 101. A bracket 181 mounts the potentiometer 103P at a location near the motor 103. The potentiometer 103P has a rotatable stem which carries a gear 182, as is best seen in FIG. 3. A gear 183 is secured to the drive shaft end region 165 and meshes with the gear 182. When the motor 103 drives the splined shaft 160, the potentiometer 103P provides a variation in an electrical signal indicative of the position of the tray 101 along the carriage rods 113, 114.

The X and Y direction drive motors 102, 103 are operable to move the tray 101 between a retracted position, shown in FIG. 2, and an exposure position overlying the opening 78 in the housing bottom wall 72. The operation of the motors 102, 103 is controlled by conventional servo-system logic circuitry which is associated with the control buttons 54 and which monitors the signals from the potentiometers 102P, 103P to assure that the tray 101 carrying the assembly 200 is properly positioned at all times.

V. The Vacuum Evacuable Assembly 200

Figure 6:
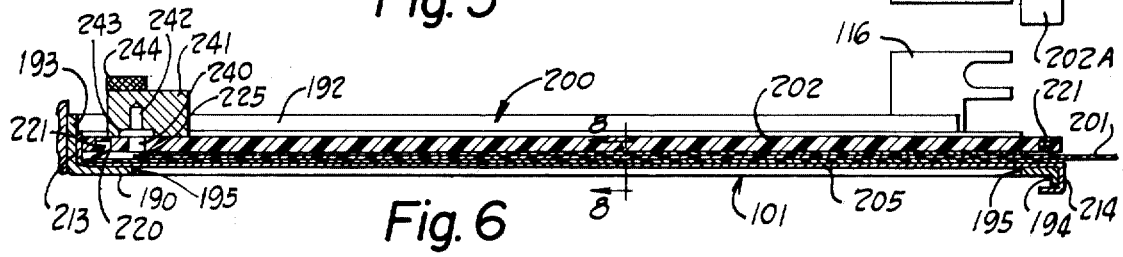
FIGS. 6 and 7 are sectional views as seen from the planes indicated by the lines 6—6 and 7—7 in FIG. 5.

Referring to FIGS. 5 and 6, the vacuum evacuable film assembly 200 is shown positioned in the tray 101. A sheet of film 201 is shown positioned in the assembly 200 with one marginal side region or "lip" 201a of the film sheet 201 projecting rightwardly outside the assembly 200. The film lip 201a is used for film identification as will be explained in Section XV.

The tray 101 has a bottom wall 190. Two upstanding sidewalls 191, 192, an upstanding front wall 193, and a depending rear wall 194 are formed integrally with the bottom wall 190. A square opening 195 is formed through the bottom wall 190.

The assembly 200 is a sandwich-like assembly of four sheets of material 202, 203, 204, 205. The uppermost sheet 202 is a relatively rigid vacuum plate preferably formed from a sheet of BAKELITE having a thickness of about 0.95 centimeter.

A pair of laterally projecting tabs 202a are formed near the right end of the vacuum plate 202, as viewed in FIG. 5. As will be explained in greater detail in Section XII, the underside of the tabs 202a are engaged by a pair of arm projections 881 (FIGS. 22, 26) when the assembly 200 is in its retracted position. When the arms 881 are elevated by the feed mechanism 500, the tabs 202a are raised to open the vacuum evacuable assembly 200 to receive or discharge a sheet of film.

The lowermost sheet 205 is a relatively flexible base plate preferably formed from aluminum having a thickness of about 0.056 centimeter. Two upstanding sidewalls 211, 212, an upstanding front wall 213, and a depending rear wall 214 are formed integrally with the base plate 205. The vacuum plate is carried within the space defined by the upstanding walls 211, 212, 213.

The intermediate sheets 203, 204 are X-radiation sensitive intensifier screens formed from any of a number of known materials that will emit visible light when subjected to X-radiation. The screens 203, 204 are adhered, respectively, to the vacuum plate 202 and the base plate 205.

Figure 7:
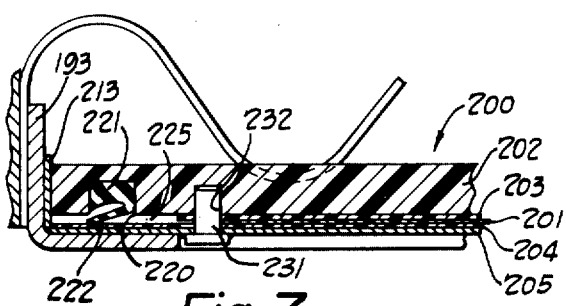
Figure 8:
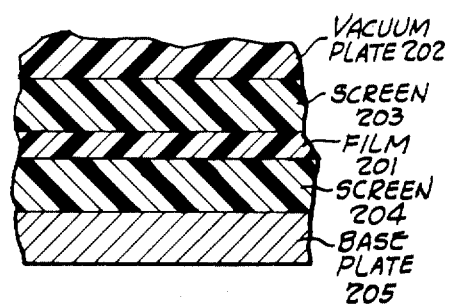
FIG. 8 is an enlarged cross-sectional view as seen from the plane indicated by the line 8—8 in FIG. 6.

A downwardly opening groove 220 is formed in the vacuum plate 202. The groove 220 extends perimetrically around the vacuum plate 202 and carries a resilient vacuum seal 221. As is best seen in FIG. 7, the seal 221 has a depending lip 222 that is normally biased into engagement with the lower intensifier screen 204. The upper intensifier screen 203 is of smaller size than the lower screen 204 and resides inwardly the perimetrical groove 220 leaving a perimetrical chamber 225 defined between the seal lip 222 and the upper screen 203, and between the vacuum plate 202 and the lower screen 204. When the chamber 225 is evacuated, ambient air pressure forces act against the base plate 205 and the vacuum plate 202, clamping the intensifier screens 203, 204 firmly into intimate contact with a sheet of film 201 positioned between the screens 203, 204.

A pair of stop pins 230, 231 are carried by the base plate 205. The pins 230, 231 extend through aligned apertures in the base plate 205 and the screens 203, 204 and into downwardly opening holes 232 formed in the vacuum plate 202. The pins 230, 231 engage the forward edge of a film sheet 201 inserted between the screens 203, 204 and act as stops to position the film sheet 201.

Referring to FIG. 6, a hole 240 is formed through the vacuum plate 202. The hole 240 communicates with the chamber 225. A connector block 241 overlies the hole 240. A passageway 242 formed in the connector block 241 communicates with the hole 240. An O-ring 243 seals the juncture of the hole 240 and the passage 242.

A pair of threaded fasteners 244 extend through aligned holes in the connector block 241 and the vacuum plate 202 to securely mount the connector block 241 on the vacuum plate 202. A hose end fitting 248 is threaded into the connector block 241. A flexible, thick-walled vacuum hose 249 is secured to the fitting 248 and communicates through the fitting 248 with the passage 242. The hose 249 is connected through an appropriate solenoid operated valve, not shown, to a vacuum pump, not shown, for selectively evacuating air from within the assembly 200.

The assembly 200 is evacuated after an unexposed sheet of film has been fed into it by the feed mechanism 500. Evacuation of the assembly 200 is maintained during positioning of the assembly 200 for film exposure, during film exposure, and during the return of the assembly 200 to its retracted position.

VI. The Upper Housing 270

Figure 11:
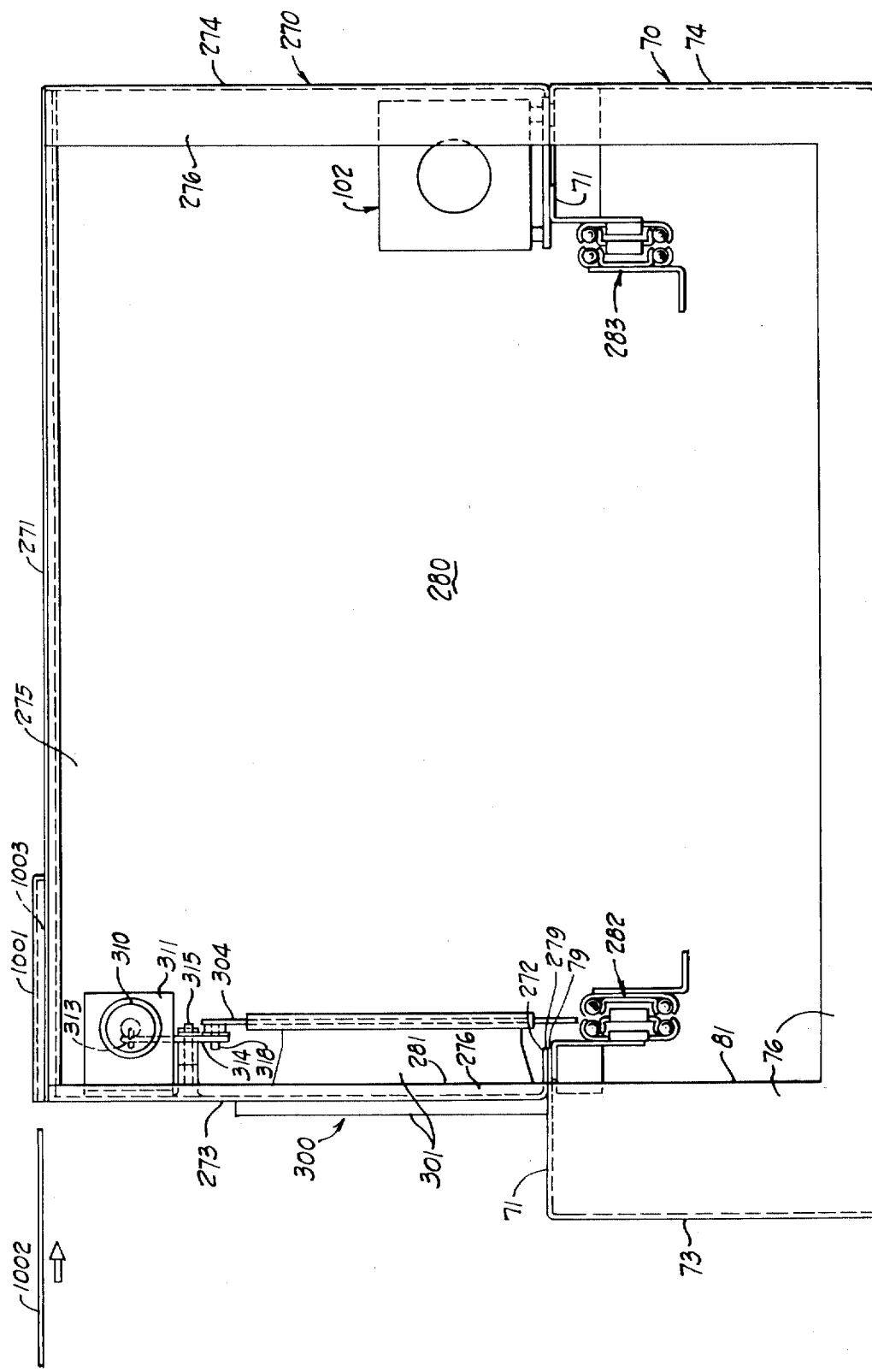
FIG. 11 is an enlarged end elevational view of a portion of the apparatus of FIG. 1 as seen from the plane indicated by the line 11—11 in FIG. 1.

Referring to FIGS. 1 and 11, the upper housing 270 is a box-like structure which is secured atop the rear end region of the lower housing 70. The upper housing has spaced top and bottom walls 271, 272 interconnected by sidewalls 273, 274, a front wall 275, and a rear wall 276.

The top wall 71 of the lower housing 70, and the bottom wall 272 of the upper housing 270 have aligned openings 79, 279 enabling the rearward end region of the lower housing 70 and the upper housing 270 to define an enlarged common space 280 for housing the film feed mechanism 500.

The rear walls 76, 276 of the lower and upper housings 70, 270 have aligned openings 81, 281 which provide access to the space 280 from behind the spot filmer 50. A light-tight door, not shown, is provided to close the openings 81, 281. A pair of roller slides 282, 283 are carried by the lower housing 70 within the space 280 to receive and support the film feed mechanism 500.

VII. The Door Assembly 300

Figure 9:
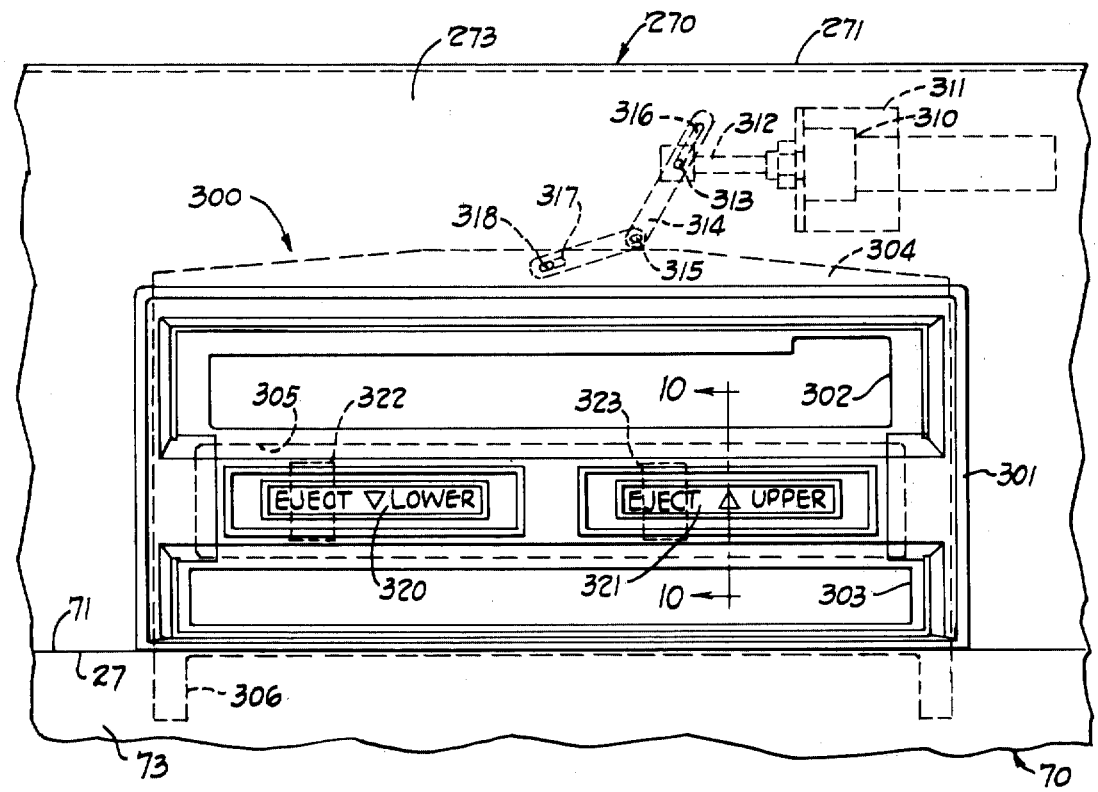
FIG. 9 is an enlarged side elevational view of a portion of the apparatus of FIG. 1 as seen from the plane indicated by the line 9—9 in FIG. 1.

Referring to FIGS. 9 and 11, a door assembly 300 is provided in the upper housing side wall 273. The door assembly 300 includes a rectangular frame member 301 which defines an upper and a lower opening 302, 303. A guilotine-like door plate 304 is slidably carried by the frame member 301 for vertical movement. A rectangular slot 305 and a U-shaped opening 306 are formed through the door plate 304. When the door plate 304 is lowered, as shown in FIGS. 9 and 11, the slot 305 and the opening 306 are out of alignment with the frame openings 302, 303. When the door plate 304 is raised, the slot 305 and the opening 306 align with the frame openings 302, 303 permitting insertion and withdrawal of the film magazines 400, 450 into and from the film feed mechanism 500.

A pneumatic cylinder 310 is mounted inside the upper housing 270. A bracket 311 secures the housing of the cylinder 310 to the housing sidewall 273. The cylinder 310 has an extensible piston rod 312 which carries a pin 313. The pneumatic cylinder 310 is double-acting, being connected at opposite end regions with pneumatic supply hoses, not shown, for effecting positive extension and retraction of the position rod 312 relative to the housing of the cylinder 310.

An L-shaped lever 314 connects the piston rod 312 to the door plate 304. A pivot pin 315 is secured to the housing side wall 273 and pivotally mounts the lever 314. One end region of the lever 314 is slotted at 316 to receive the pin 313. The other end region of the lever 314 is slotted at 317 to receive a pin 318 secured to the door plate 304. When the piston rod 312 is extended and retracted, the connections between the pins 313, 317 and the lever 314 cause the door plate 304 to close and pen the openings 302, 303.

Figure 10:
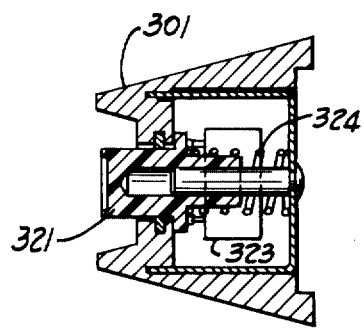
FIG. 10 is an enlarged sectional view as seen from the plane indicated by the line 10—10 in FIG. 9.

A pair of switch buttons 320, 321 are carried by the frame member 301. The switch buttons 320, 321 are of identical construction and connect respectively with identical switches 322, 323. The button 321 is operative when depressed to actuate the switch 322 for effecting ejection of the exposed film magazine 450 from the mechanism 500. The button 322 is operative when depressed to actuate the switch 323 for effecting ejection of the unexposed film magazine 400 from the feed mechanism 500. As is seen in FIG. 10, compression coil springs 324 operate on the buttons 320, 321 to bias the buttons 320, 321 to an extended position.

VIII. The Unexposed Film Magazine 400

Referring to FIGS. 12–15 the unexposed film magazine 400 includes spaced top and bottom plates 401, 402. A pair of side plate assemblies 403, 404 and a back plate 405 extend between the top and bottom plates 401, 402. Threaded fasteners 406 extend through the top and bottom plates 401, 402 and into the side and back plates 403, 404, 405 to define a three-sided enclosure.

A cover 410 is provided for opening and closing the open end of the magazine 400. The cover 410 includes a C-shaped plate having integrally formed top and bottom legs 411, 412 connected by a transversely extending intermediate portion 413. A pair of arms 414, 415 are secured to opposite ends of the cover 410 and pivotally mount the cover 410 on the side assemblies 403, 404.

A slot 416 is formed in each of the arms 414, 415. Threaded fasteners 417 extend through the slots 416 and into the side assemblies 403, 404. The fasteners 417 are slidably received in the slots 416 permitting the cover 410 to move relative to the assembly of top, bottom and side walls 401, 402, 403, 404.

A recess 418 is formed in each of the arms 414, 415. The recesses 418 extend from the vicinity of the slots 416 forwardly about half the length of the arms 414, 415. Threaded fasteners 419 are carried by the arms 414, 415 and extend into forward end regions of the recesses 418. Elastic bands 420 positioned in the recesses 418 are reeved around the fasteners 419 and around the fasteners 417 to bias the cover 410 rearwardly toward a position where the threaded fasteners 417 engage the forward ends of the slots 416, as shown in FIG. 14.

In the magazine closed position shown in FIG. 13, the top and bottom legs 411, 412 of the cover 410 are received in notches 421, 422 formed in the top and bottom plates 401, 402. When the magazine 400 is open, as shown in FIG. 14, the cover 410 is pivoted upwardly.

The side assemblies 403, 404 each include an inner plate 424 and an outer channel shaped plate 425. Three threaded fasteners 426 extend through the outer plates 425 and are threaded into the inner plates 424 to hold the channel-shaped outer plates 425 in place. Passageways 427 are defined between the plates 424, 425. A pair of magazine unlatching members 428 are carried in the passageways 427. Each of the unlatching members 428 has a longitudinally extending slot 429 which receives bushings 430 carried on the fasteners 426.

One end region of the latching members 428 is adjacent the back plate 405. The other end region of the latching members 428 is adjacent the cover support arms 414, 415. When the unlatching arms 428 are moved rightwardly as viewed in FIGS. 12, 14, the members 428 engage the arms 414, 415 causing the cover 410 to move rightwardly until the threaded fasteners 417 are in engagement with the left end of the slots 416. This unlatching movement brings the lower leg 412 of the cover plate 410 forwardly of the bottom plate 402 permitting the cover 410 to pivot upwardly to the position of FIG. 13.

A bracket 431 is carried centrally atop the leg 411 of the cover 410. An opening 432 is formed through the bracket 431. As will be explained, the opening 432 is engaged by a cover opening mechanism when the magazine 400 is inserted into the film feed mechanism 500.

A transversely extending trackway 433 is formed in the bottom plate 402. As will be explained, the trackway 433 guides the travel of the magazine 400 in the film feed mechanism 500 during insertion and ejection of the magazine 400.

A recess 434 is formed in the top plate 401. As will be explained, the recess 434 is engaged by a spring biased detent when the magazine 400 is inserted into the film feed mechanism 500.

A support plate 435 is pivotally carried within the magazine 400. A hinge 436 connects the rearward end of the support plate 435 to the bottom plate 402. A pair of brackets 437 are secured to the forward end region of the support plate 435. The brackets 437 are provided with notches 438. Film sheets (not shown) carried in the unexposed film magazine 400 rest atop the support plate 435.

IX. The Exposed Film Magazine 450

Referring to FIGS. 16–20 the exposed film magazine 450 includes top and bottom plates 451, 452. A pair of side plates 453, 454, a front plate 455, and a back plate 456 are notched to receive the periphery of the bottom plate 452. Threaded fasteners 457 secure the top plate 452 to the side and back members 453, 454, 456. The top plate 451 has an inwardly turned forward end region 458.

A cover 459 is slidably carried in trackways 460 formed in the side members 453, 454. The cover 459 has an overturned flange 461 on its rear portion which mates with the underturned end region 458 formed on the top plate 451 to form a light seal between the cover 459 the top plate 451. The cover 459 is slidable leftwardly as viewed in FIGS. 16, 17 to open a portion of the upper surface of the exposed film magazine 450 to receive exposed film sheets.

A latching bar 470 extends transversely across the top of the exposed film magazine 450. Opposite end regions of the latching bar 470 carry latching pins 471. As is best seen in FIG. 20 the latching pins 471 extend, into holes 472 formed in the sidewalls 453, 434. Lower end regions 473 of the pins 471 carry compression coil springs 474 which bias the pins 471 upwardly. Notches 475 are formed in one side of the pins 471. When the pins 471 are depressed to a position where the notches 475 align with the trackways 460, the cover 459 can move leftwardly as viewed in FIGS. 16, 17 to open the magazine 450. When the cover 459 is moved to its closed position, as shown in FIGS. 16, 17 the springs 474 operate to bias the pins 471 and the bar 470 upwardly to the position shown in FIGS. 17, 20.

A trackway 480 is defined between the magazine latching bar 470 and the top plate end region 458. As will be explained, when the magazine 450 is inserted in the film feed mechanism 500, the trackway 480 guides the movement of the magazine 450.

A bar 459a is carried atop the forward end region of the cover 459. As will be explained, when the magazine 450 is inserted in the film feed mechanism 500, the bar 459a is engaged by a mechanism for opening the cover 459.

Referring to FIGS. 16 and 19, a recess 490 is formed in the bottom plate 452. As will be explained, the recess 490 is engaged by a spring biased detent when the magazine 450 is inserted into the film feed mechanism 500.

X. An Overview of the Film Feed Mechanism 500

Figure 23:
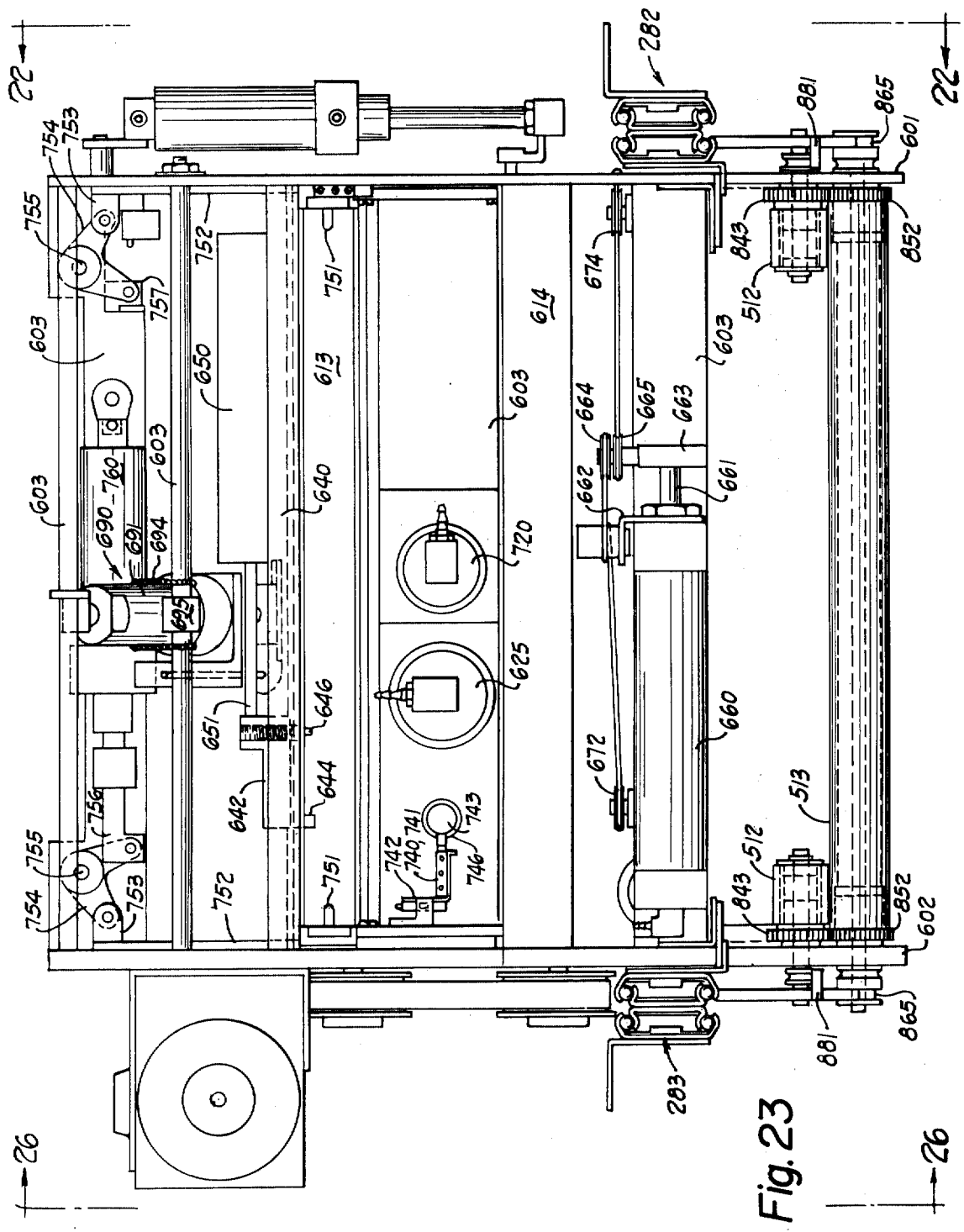
FIG. 23 is an elevational view of the apparatus of FIG. 22 as seen from the plane indicated by the line 23—23 in FIG. 22.

The film feed mechanism 500 is an assembly which can be removed as a unit from the housing space 280. As is best seen in FIG. 23, the film feed mechanism 500 has a pair of spaced, vertically extending side plates 601, 602 interconnected by transversely extending cross-members 603. The feed mechanism 500 is supported by the roller slides 282, 283 which permit the mechanism to be rolled into and out of the housing space 280 through the rear housing openings 81, 281.

Figure 21:
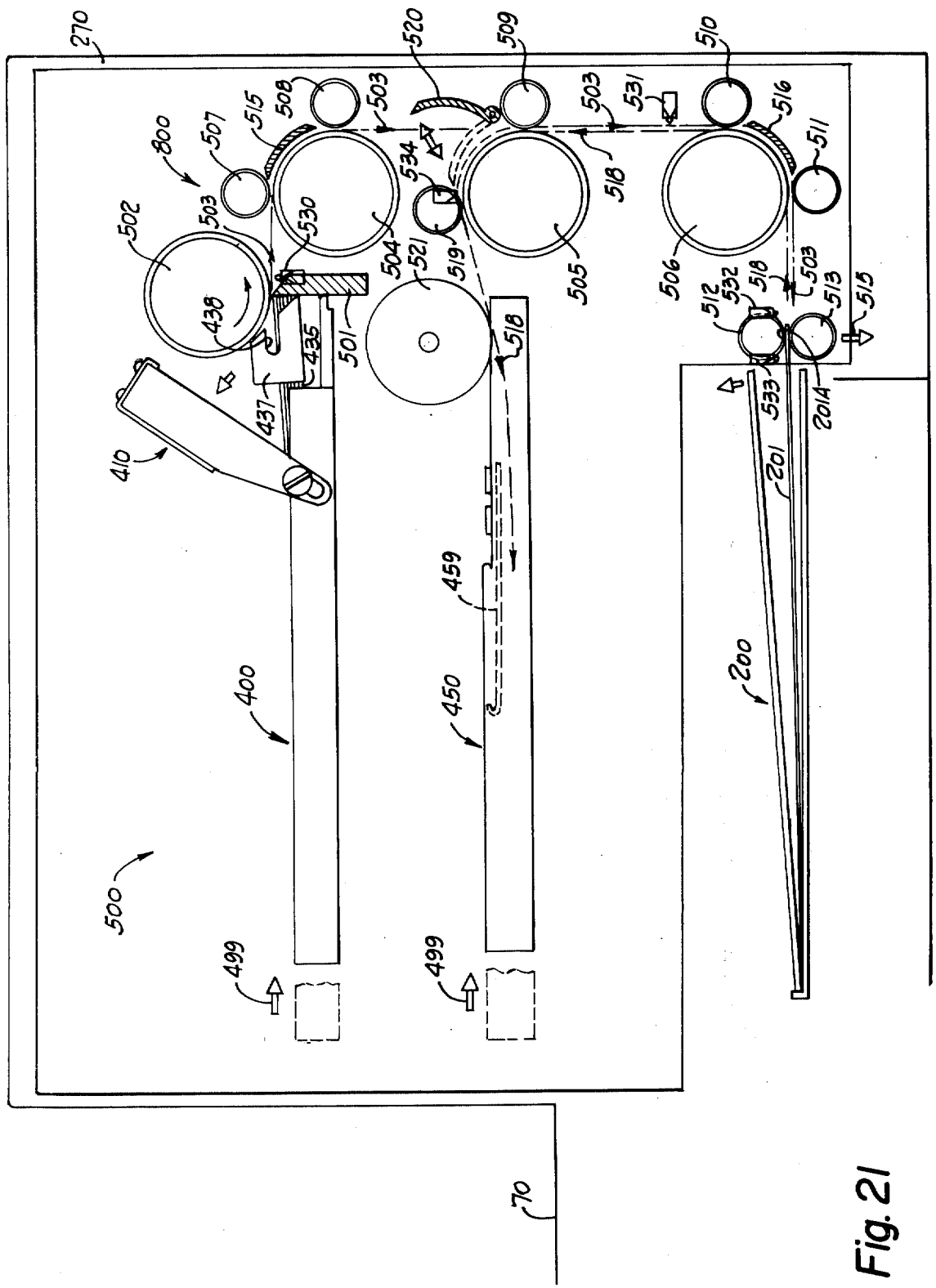
FIG. 21 is a schematic side elevational view showing a number of the components of the film feed mechanism of the apparatus of FIG. 1.

Before describing the structure of the film feed mechanism 500, reference is made to FIG. 21 which schematically depicts several of the film feed mechanism components. As will be explained in greater detail, the film magazines 400, 450, are inserted in the film feed mechanism 500 at positions indicated in phantom in FIG. 21. Before an unexposed film sheet can be fed from the unexposed film magazine 400, and before an exposed film sheet can be fed into the exposed film magazine 450, the covers of the magazines 400, 450 must be opened and the magazines 400, 450 must be moved to the positions shown in solid lines in FIG. 21. An operating mechanism 600 (not shown in FIG. 21) for opening and moving the magazines 400, 450 will be described.

A feed roll system 800 is provided to feed film sheets to and from the magazines 400, 450. Once the magazines 400, 450 are moved to the solid line positions shown in FIG. 21 feeding of a sheet of film from the unexposed film magazine 400 is initiated by raising the support plate 435 in the unexposed film magazine 400 to bring the top sheet of unexposed film into the engagement with a main feed roll 502. As the feed roll 502 rotates, the top film sheet is fed between the roll 502 and a gate bar 501.

Feeding of the film sheet continues along a path indicated by arrows 503. The film feed path 503 is defined by large diameter rolls 504, 505, 506, small diameter rolls 507, 508, 509, 510, 511, fixed film guides 515, 516, and pinch rolls 512, 513. The pinch rolls 512, 513 direct the film sheet into the vacuum evacuable assembly 200. A sheet of film positioned in the vacuumm evacuable assembly 200 is indicated by the reference numeral 201. This film sheet 201 has a "lip" 201A which extends between the pinch rolls 512, 513.

Before the assembly 200 moves to carry the film sheet 201 to an exposure station, the lower pinch roll 513 is lowered, as indicated by the arrow 515, to release the lip 201A of the film sheet 201. The assembly 200 then carries the film sheet 201 to an exposure station and returns the exposed film sheet to position the film lip 201A between the pinch rolls 512, 513.

Feeding of the exposed film sheet 201 from the vacuum evacuable assembly 200 to the exposed film magazine 450 is initiated by the raising of the lower pinch roll 513. The film sheet 201 is fed along a path indicated by arrows 518. The film feed path 518 is defined by the pinch rolls 512, 513, the small diameter rolls 511, 510, 509, a movable film guide 520, a small diameter roll 519, and by a soft sponge rubber roll 521. During feeding of a film sheet from the film assembly 200 to the exposed film magazine 450, the film guide 520 assumes the position indicated in phantom in FIG. 21 to guide the film sheet between the roller 519 and the roll 505. The soft sponge rubber roller 521 is positioned atop the open exposed film magazine 450 and guides the film sheet 201 into the exposed film magazine 450.

The feeding of feed sheets along the paths 503, 518 is monitored by a series of light emitting diode and sensor units 530, 531, 532, 533, 534. Each of the diode units 530–533 includes a light source which projects invisible infra-red radiation light toward the associated film path it monitors. When a sheet of film passes along the associated film path, the infra-red light is reflected back onto a light sensitive portion of the diode unit. Upon re-eiving reflected light, the diode unit provides a variation in an electrical signal indicating the presence of a film sheet adjacent the diode unit. Light emitting diode and sensor units of this type are commercially available from a number of companies, one being Monsanto Company, St. Louis, Mo. 63166, offering doide-sensor units under the model designation MCA-7.

XI. The Magazine Positioning System 600

Figure 22:
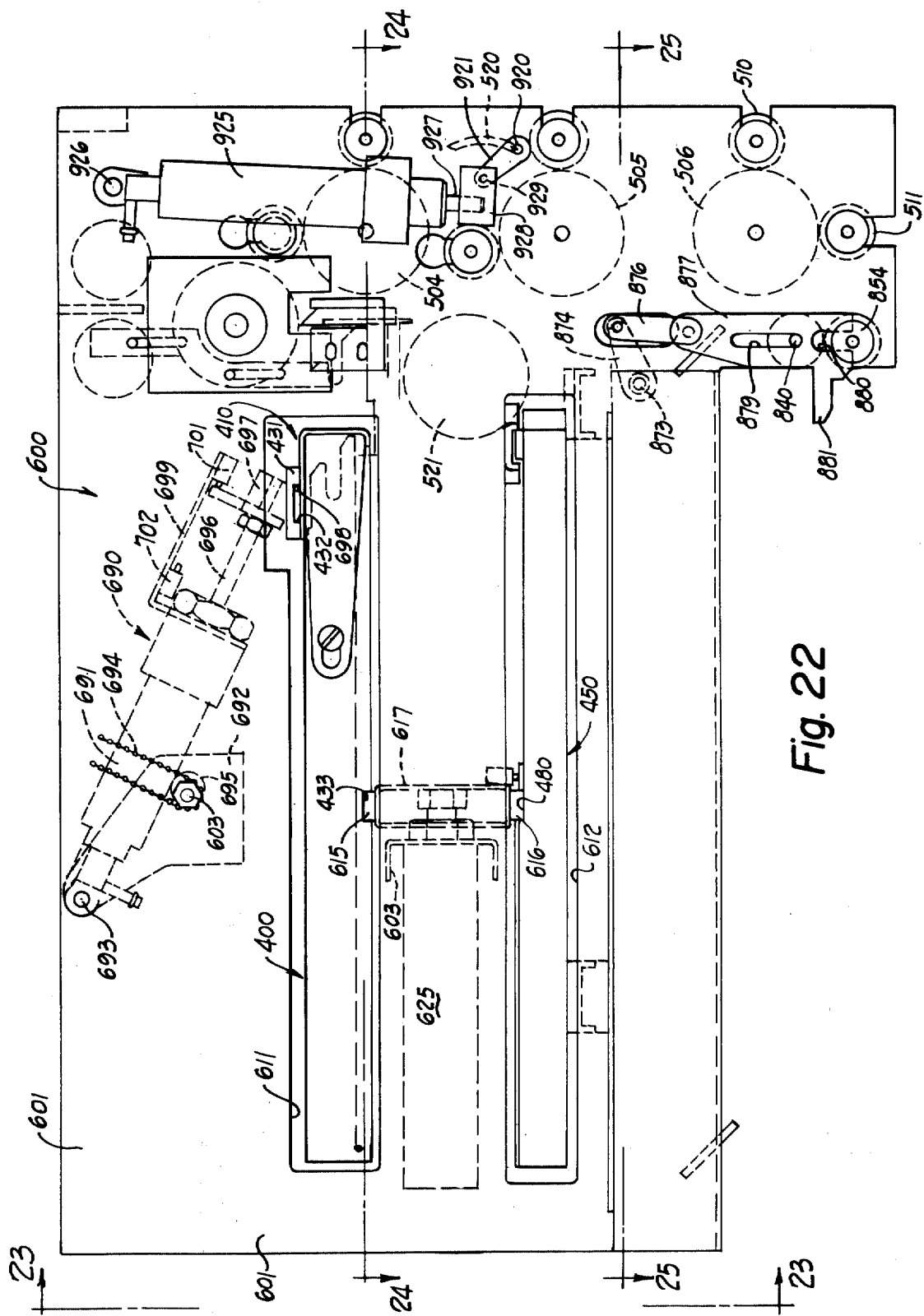
FIG. 22 is a side elevational view of the film feed mechanism.
Figure 24:
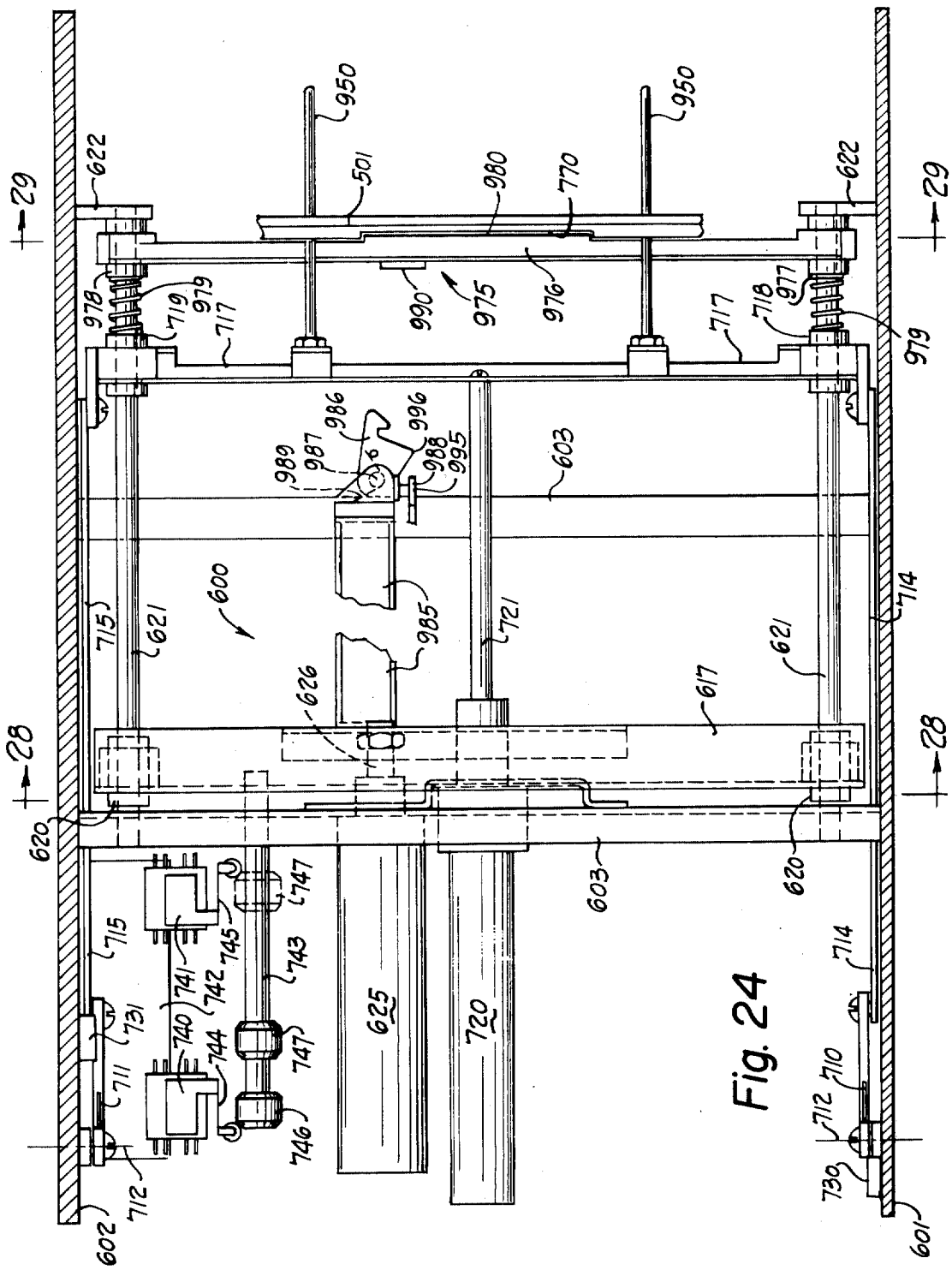
FIGS. 24 and 25 are sectional views as seen from the planes indicated by the lines 24—24 and 25—25 in FIG. 22.
Figure 27:
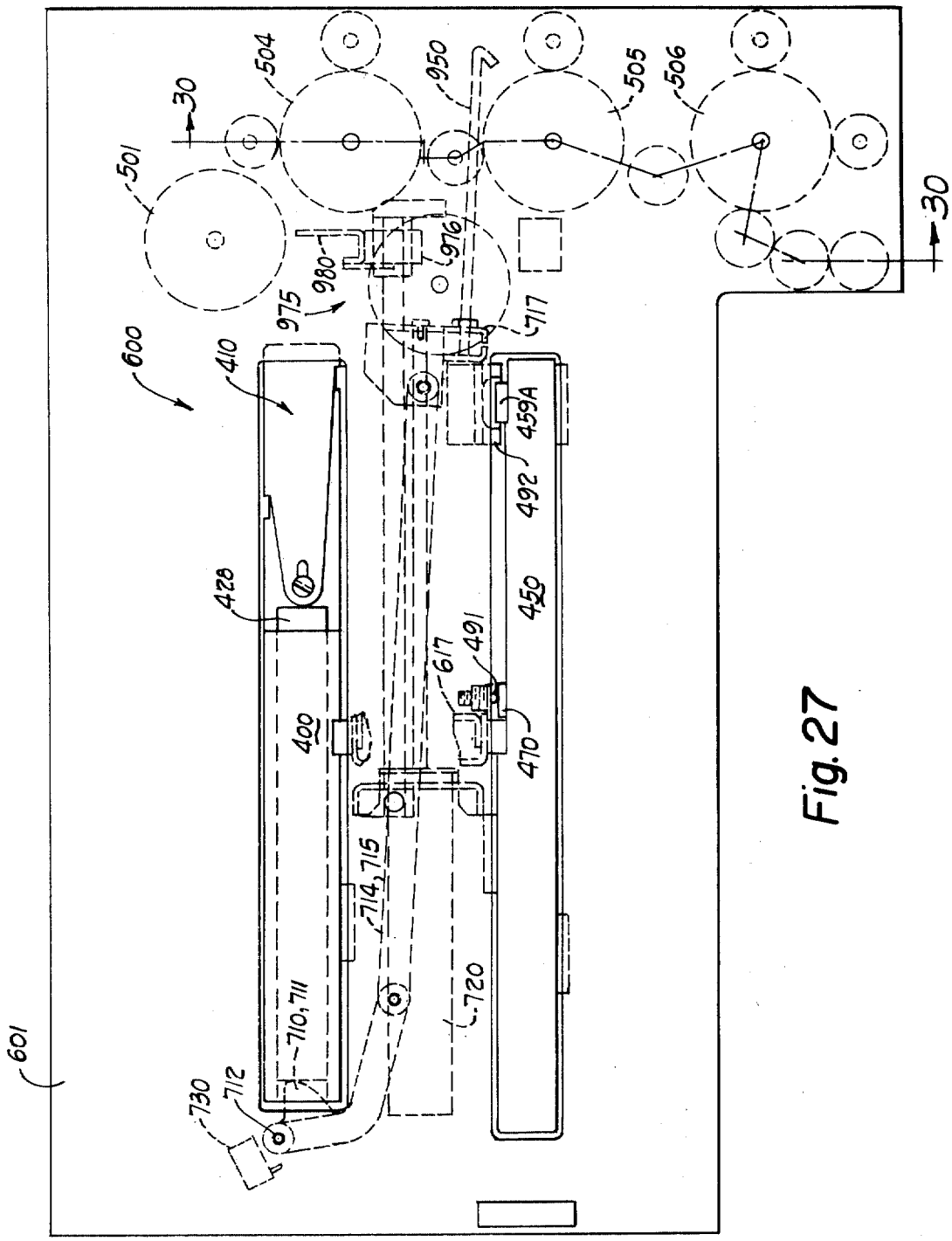
FIG. 27 is a side elevational view similar to FIG. 27 but illustrating certain other details of the feed mechanism 500.

Referring to FIGS. 22, 24 and 27, a magazine positioning system is indicated generally by the numeral 600. As will be explained, the system 600 includes several independently operable subassemblies (1) for inserting and ejecting the magazines 400, 450; (2) for unlatching and opening the magazine 400, and for extending and retracting the magazines 400, 450.

A. Magazine Insertion and Ejection

Figure 28:
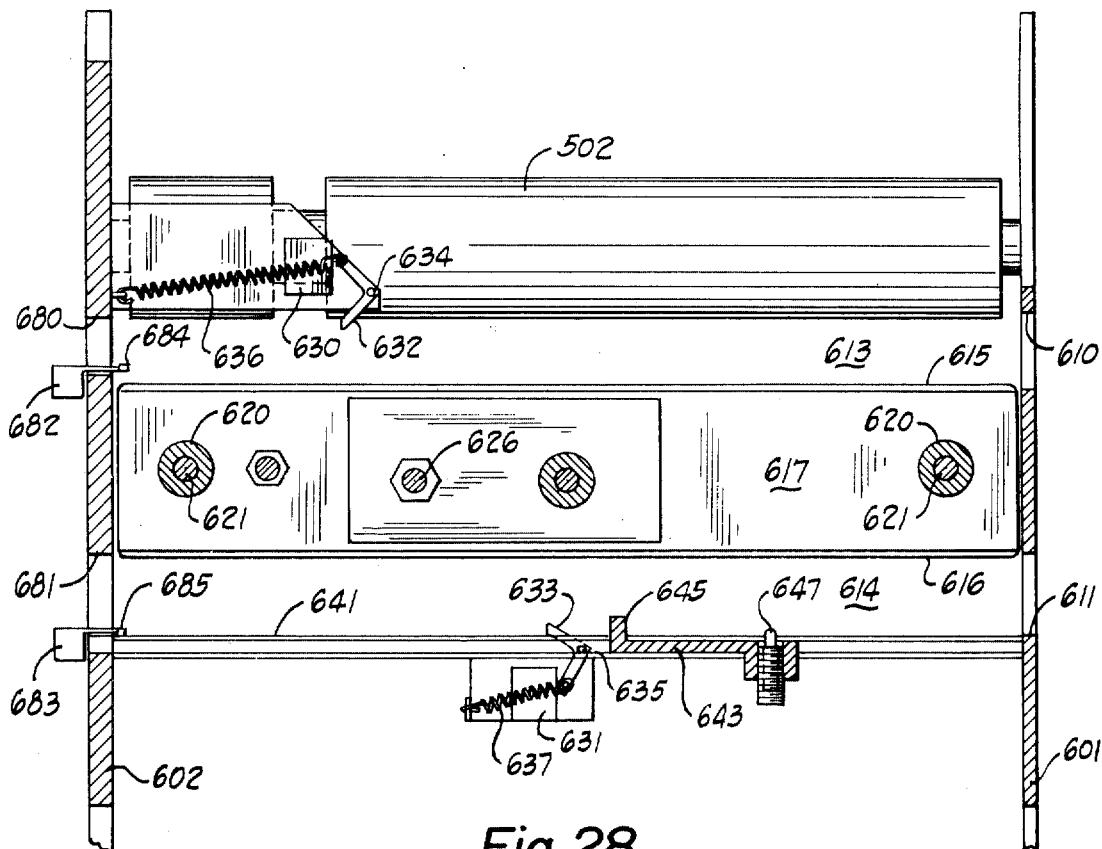
FIGS. 28 and 29 are sectional views as seen from the planes indicated by the lines 28—28 and 29—29 in FIG. 24.

Referring to FIGS. 22 and 28, two generally rectangular openings 610, 611 are formed through the side plate 601. The upper opening 610 defines the entrance to a passageway 613 through which the unexposed film magazine 400 can be inserted into and ejected from the film feed mechanism 500. The lower opening 611 defines the entrance to a passageway 614 through which the exposed film magazine can be inserted and ejected.

A pair of guides 615, 616 engage the magazine trackways 433, 480 as the magazines 400, 450 move through the passageways 613, 614. The guides 615, 616 are hardened metal bars which extend laterally between the side plates 601, 602. A hollow rectangular bar 617 carries the guides 615, 616.

Referring to FIG. 24, a pair of bushings 620 are carried by opposite end regions of the bar 617. The bushings slidably journal a pair of guide rods 621. A pair of brackets 622 are secured to the side plates 601, 602 and support one end of each of the guide rods 621. The opposite ends of the guide rods 621 are supported by one of the frame cross-members 603.

A double-acting pneumatic cylinder 625 is carried by one of the cross-members 603. The cyclinder 625 has an extensible piston rod 626. The piston rod 626 is secured to the hollow bar 617 to reciprocate the bar 617 along the guide rods 621 when the piston rod 626 extends and retracts from the housing of the cylinder 625.

Referring to FIG. 28, a pair of swtiches 630, 631 are provided respectively alongside the passageways 613, 614. A pair of L-shaped levers 632, 633 are pivotally mounted about axes 634, 635 at positions near the switches 630, 631. A pair of tension coil springs 636, 637 bias one leg of the levers 632, 633 into engagement with actuator buttons carried by the switches 630, 631, and bias the other legs of the levers 632, 633 into the passages 613, 614. As the magazines 400, 450 are pushed into the passages 613, 614, the magazines 400, 450 engage the levers 632, 633 causing the levers 632, 633 to pivot about the axes 634, 635 and actuating the swtiches 630, 631.

Figure 26:
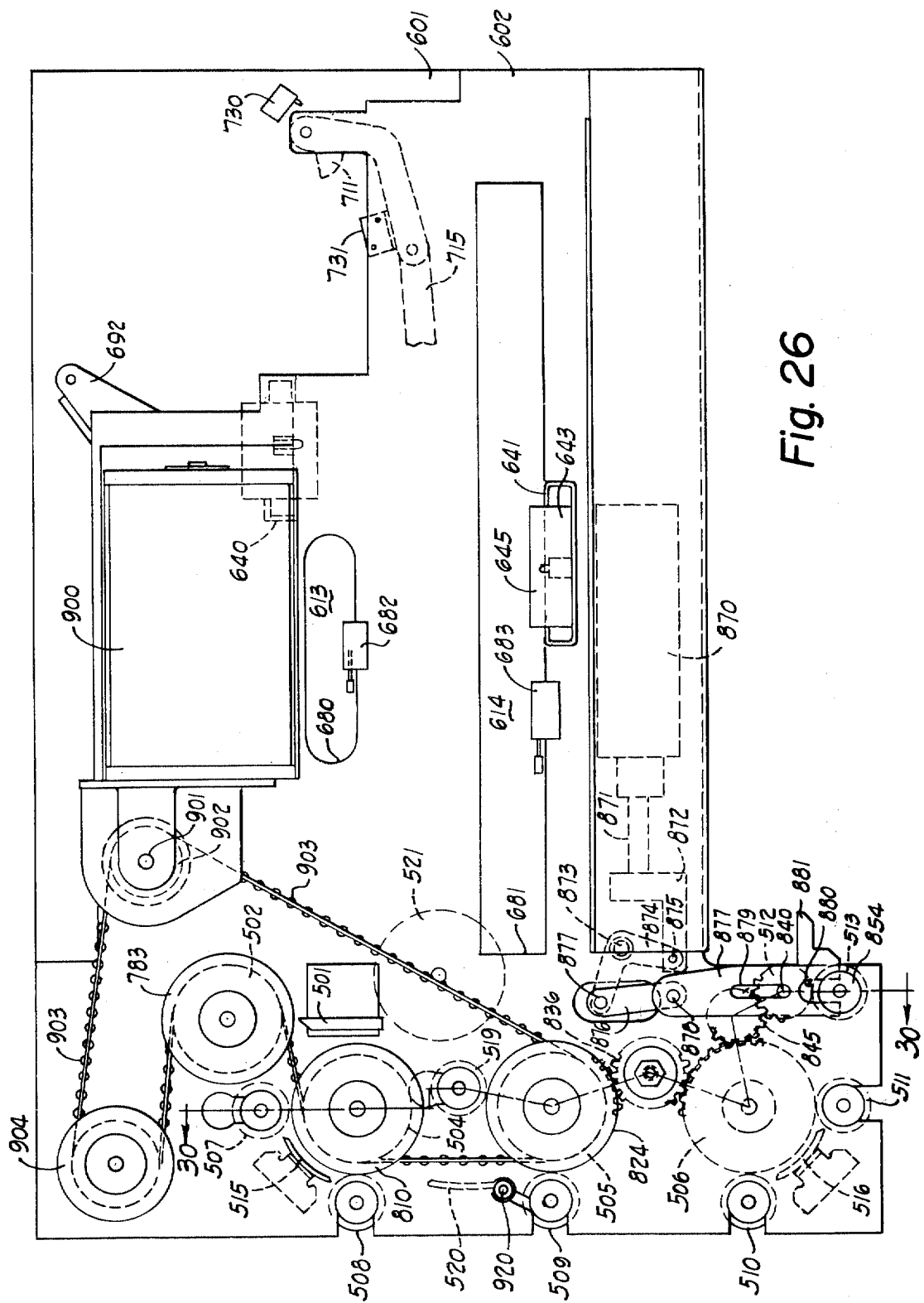
FIGS. 26 is a side elevational as seen from the plane indicated by the line 26—26 in FIG. 23.

Referring to FIGS. 23 and 28, a pair of trackways 640, 641 are provided respectively above the passageway 613 and below the passagway 614. The trackways 640, 641 are of identical cross-section, as is best seen in FIG. 26. A pair of slides 642, 643 of substantially identical construction are slidably carried in the trackways 640, 641. The slides carry stop formations 644, 645 which extend respectively into the passagways 613, 614. The slides 642, 643 also carry spring biased detent pins 646, 647 which project into the passageways 613, 614.

When the film magazines 400, 450 are inserted into the passageways, the magazines 400, 450 depress the pins 646, 647 and move inwardly along the slides 642, 643 until the sidewalls 404, 454 of the magazines 400, 450 engage the stops 644, 645. At the same time the sidewalls 404, 454 are brought into engagement with the stops 644, 645, the detent pins 646, 647 are aligned with the recesses 434, 490 formed in the magazines 400, 450. The detent pins snap into the recesses 434, 490 establishing a driving connection between the slides 642, 643 and the magazines 400, 450.

Referring to FIG. 23, a double-acting pneumatic cyclinder 650 is supported atop the trackway 640. The cylinder 650 has an extensible piston rod 651. The piston rod 651 is connected to the slide 642 and reciprocates the slide 642 along the trackway 640 when the piston rod 651 extends and retracts from the housing of the cylinder 650.

During insertion of the unexposed film magazine 400 into the passage 613 and at a time after a driving connection has been established between the magazine 400 and the slide 642, the magazine 400 engages the lever 632 actuating the switch 630. The switch 630 is connected to a solenoid valve (not shown) for supplying pressurized air to the cylinder 650. Actuation of the switch 630 causes pressurized air to be supplied to the cylinder 650. The piston rod 651 is caused to extend, moving the slide 642 and the magazine 400 to a fully inserted position.

Figure 25:
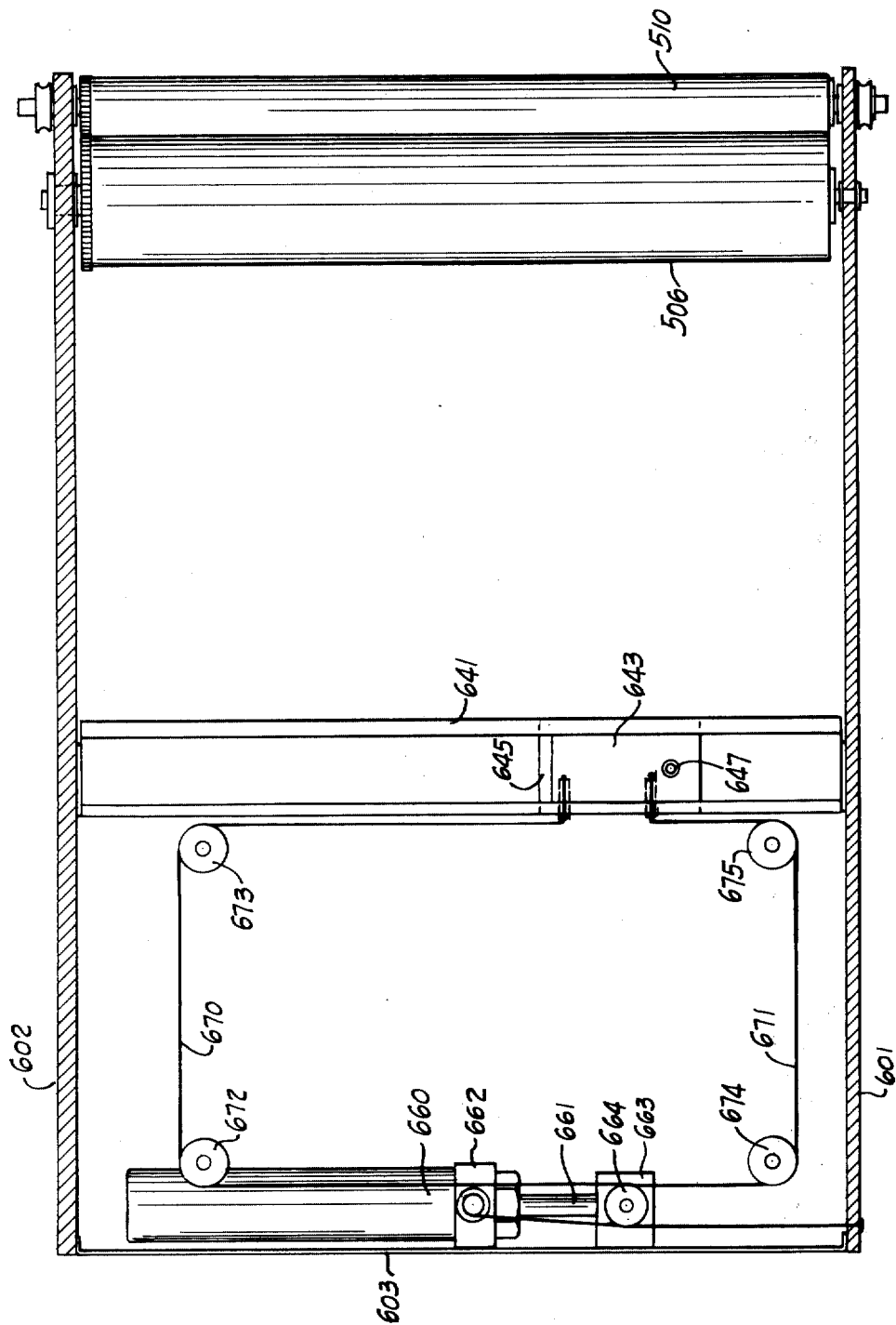

Referring to FIGS. 23 and 25, a double-acting pneumatic cylinder 660 is provided for moving the lower slide 643 along the trackway 641. The cylinder 660 is supported on a bracket 662 carried by one of the cross-members 603. the cylinder 660 has an extensible piston rod 661 which carries a pulley support bracket 663. A pair of pulleys 664, 665 are rotatably supported atop the bracket 663.

A cable and pulley drive system including a pair of cables 670, 671 drivingly connects the cylinder 660 and the slide 643. Four pulleys 672, 673, 674, 675 are rotatably carried by two of the cross-bars 603. The cables 670, 671 each have one end secured to the slide 643. The other ends of the cables 670, 671 are secured respectively to the bracket 662 and to the sidewall 601.

The cable 670 is reeved around the pulleys 664, 672, 673 as shown in FIG. 25. The cable 671 is reeved around the pulleys 665, 674, 675. When the piston rod 661 extends or retracts, the pulleys 664, 665, cause the cables 670, 671 to translate the slide 643 in the trackway 641.

During insertion of the exposed film magazine 450 into the passage 614 and at a time after a driving connection has been established between the magazines 450 and the slide 643, the magazine 450 engages the lever 633 actuating the switch 631. The switch 631 is connected to a solenoid valve (not shown) for supplying pressurized air to the cylinder 660. Actuation of the switch 631 causes pressurized air to be supplied to the cylinder 660. The piston rod 661 is caused to extend, moving the slide 643 and the magazine 450 to a fully inserted position.

Referring to FIG. 27, a spring biased detent pin 491 is carried on the hollow bar 617 for depressing the magazine unlatching bar 470 to unlatch the exposed film magazine 450 as the magazine 450 is inserted into the film feed mechanism 500. A slotted bracket 492 carried inside the sidewall 601 engages the magazine cover bar 459a. When the magazine 450 is moved rightwardly to its extended position, as shown in FIG. 21, the engagement between the bracket 492 and the bar 459a causes the magazine cover 459 to open.

Referring to FIGS. 26 and 28, a pair of slots 680, 681 are formed through the sidewall 602 adjacent the ends of the passageways 613, 614. A pair of switches 682, 683 are carried on the sidewall 602. The switches 682, 683 have actuating levers 684, 685 that extend through the slots 680, 681. When the magazines 400, 450 reach their fully inserted position, the magazines 400, 450 engage the levers 684, 685 actuating the switches 682, 683. The switches 682, 683 are connected electrically in series and serve to prohibit extension and retraction of the magazine 400, 450 within the feeding mechanism 500, as will be described, except when both film magazines 400, 450 are in their fully inserted position.

Ejection of the magazines 400, 450 is effected by depressing the buttons 320, 321 to actuate the switches 322, 323, FIG. 9. The switches 322, 323 are electrically connected to solenoid valves (not shown) which supply pressurized air to the cylinders 310, 650, 660. Depression of the buttons 320, 321 will cause the piston rods 312, 651, 661 to retract opening the door 304 and ejecting the magazines 400, 450.

B. Magazine Extension

During insertion of the unexposed film magazine 400 into the passageway 613, the laterally extending opening 432 formed in the cover opening bracket 431 of the magazine 400 is engaged by a cover opening unit 690. Referring to FIGS. 22 and 23, the cover opening unit 690 includes a double-acting pneumatic cylinder 691. A bracket assembly 692 pivotally supports the upper, leftward end (as viewed in FIG. 22) of the cylinder 691 for movement about an axis 693. A stop 695 is supported on one of the cross-members 603 at a position beneath the housing of the cylinder 691. A tension coil spring 694 is reeved around the housing of the cylinder 691 and biases the cylinder clockwise about the axis 693 to a position where the cylinder housing engage the stop 695.

The cylinder 691 has an extensible piston rod 696. A bracket 697 is carried on the end of the rod 696. A pointed, laterally extending pin 698 is supported on the bracket 697. During insertion of the magazine 400 into the passageway 613, the pin 698 is received in the opening 432 formed in the cover bracket 431.

Referring to FIG. 22, a switch mounting bracket 699 is carried on the housing of the cylinder 691. A pair of switches 701, 702 are mounted on the bracket 699. The switches 701, 702 have actuating plungers that are selectively engaged by the piston rod bracket 697 when the piston rod 696 is extended and retracted. The switches 701, 702 provide variations in electrical output signals indicating whether the cover 410 of the magazine 400 is closed or open.

Preparatory to the feeding of a sheet of unexposed film from the unexposed film magazine 400, the cover 410 of the unexposed film magazine must be unlatches and opened. The unlatching operation is accomplished by moving a pair of actuating arms into engagement with the rearward ends of the magazine unlatching members 428, causing the members 428 to move forwardly unlatching the cover 410 in the manner described in section VIII.

Referring to FIGS. 24 and 27, the actuating arms which perform this unlatching function are indicated by the numerals 710, 711. The arms 710, 711 are pivotally mounted on the side plates 601, 602 for rotation about a common axis 712. A pair of links 714, 715 each have one end region which pivotally connects with the arms 710, 711. The other end regions of the links 714, 715 pivotally connect with a side bar 717.

The slide bar 717 extends laterally between the side plates 601, 602 and carries a pair of bushings 718, 719. The bushings slidably journal the guide rods 621, mounting the slide bar 717 for movement along the guide rods.

A double-acting pneumatic cylinder 720 is provided for moving the slide bar 717 along the guide rods 621. The cylinder 720 is carried by one of the cross-members 603 and has an extensible piston rod 721. The piston rod 721 has its distal end secured to the slide bar 717.

When the slide bar 717 is moved is moved along the guide rods 621 by extension and retraction of the piston rod 721, the links 714, 715 pivot the levers 710, 711 about the axis 712. Extension of the piston rod 721 to the position shown in FIGS. 24, 27 pivots the arms 710, 711 into engagement with the magazine unlatching members 428, causing the magazine cover 410 to move forwardly to an unlatched position. While the cover 410 is in the unlatched position, the cover opening cylinder 691 is actuated to retract the piston rod 696 and open the magazine cover 410.

Referring to FIGS. 26 and 27, forward and rearward movements of the piston rod 721, the slide bar 717 and the arms 710, 711 are monitored by a pair of limit switches 730, 731. The switches 730, 731 are carried respectively on the sidewalls 601, 602 for engagement with the arms 710, 711. When the arms 710, 711 are pivoted forwardly to the positions shown in FIGS. 24, 26 and 27, the arm 711 engages and actuates the switch 731. When the arms 710, 711 are pivoted rearwardly, the arm 710 engages and actuates the switch 730.

The switch 731 is connected to a solenoid operated valve (not shown) which supplies pressurized air to the cylinder 691. When the arms 710, 711 have pivoted to unlatch the magazine cover 410, the switch 731 is actuated, causing pressurized air to be supplied to the cylinder 691 to retract the piston rod 696 and open the cover 410.

Once the cover 410 has been opened by retraction of the piston rod 696, the switch 702 is actuated. The switch 702 is connected to a solenoid operated valve (not shown) which supplies pressurized air to the cylinder 625. When the switch 702 is actuated, air is supplied to the cylinder 625 causing the piston rod 626 to extend. Extension of the piston rod 626 moves the hollow bar 617 and the magazines 400, 450 forwardly to the position shown in solid lines in FIG. 21.

Referring to FIGS. 23 and 24 a pair of limit switches 740, 741 monitor the positioning of the magazines 400, 450. The switches 740, 741 are supported on a bracket 742. The bracket 742 is secured to the sidewall 602. The switches 740, 741 have actuating levers 744, 745. An indicator rod 743 is cantilevered from the hollow bar 617. A pair of cams 746, 747 are carried on the indicator rod 743. When the piston rod 626 is retracted, the cam 746 engages the lever 744 actuating the switch 740. When the piston rod 626 is extended, the cam 747 engages the lever 745 actuating the switch 741. Once the magazines 400, 450 have moved forwardly to the position shown in FIG. 21 and the switch 741 has been actuated, the feeding of a film from the unexposed film magazine can begin.

As the unexposed film magazine 400 is moved forwardly to the position shown in FIG. 21, a pair of pins engage the slots 438 formed in the brackets 437. Referring to FIG. 23, the pins which engage the slots 438 are indicated by the reference numeral 751.

The pins 751 are carried on lower end regions of a pair of arms 752. The arms 752 are slidably supported by guides (not shown) for vertical movement along the inner surfaces of the side plates 601, 602. The upper ends of the arms 752 carry inwardly projecting tabs 753.

A pair of L-shaped levers 754 are pivotally carried by one of the cross-members 603 for pivotal movement about axes 755. One leg of each of the levers 754 is pivotally connected to the tabs 753. The other legs of the levers 754 are pivotally connected to a pair of piston rods 756, 757.

A pair of double-acting pneumatic cylinders 760 (only one of which can be seen in FIG. 23) are secured to opposite sides of one of the cross-members 603. Each of the piston rods 756, 757 is extensibly carried by a separate one of the cylinders 760. When the cylinders 760 are concurrently actuated to extend the piston rods 756, 757, the levers 754 pivot causing the arms 752 to raise the pins 751.

As the pins 751 are elevated by the cylinders 760, the pins 751 raise the brackets 437 and the support plate 435 to bring the top sheet of unexposed film carried in the magazine 400 into engagement with the main feed roll 502, as illustrated in FIG. 21.

The switch 731 (FIG. 26) is connected to a solenoid valve (not shown) which supplies pressurized air to the cylinders 760. When the switch 731 is actuated by the arm 711, pressurized air is supplied to the cylinders 760 to extend the piston rods 756, 757 and elevate the support plate 435 to bring a sheet of film into engagement with the main feed roll 502 for feeding between the main feed roll 502 and the gate bar 501.

XII. The Feed Roll System 800

Figure 29:
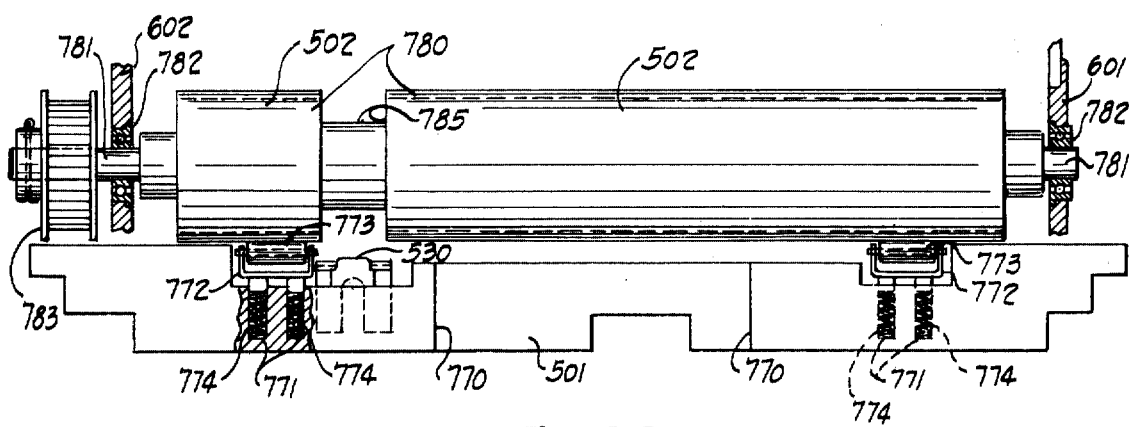

Referring to FIGS. 24 and 29, the gate bar 501 is a rigid steel bar which extends laterally between and is secured to the side plates 601, 602. Opposite ends of the gate bar 501 extend through openings (not shown) in the sidewalls 601, 602. A recess 770 is formed in the central region of the gate bar 501. Two pairs of upwardly facing holes 771 are formed in the gate bar 501. A pair of two-legged yokes 772 are supported by the gate bar 501 with the yoke legs extending into the holes 771. A pair of rollers 773 are rotatably carried by the yokes 772. Two pairs of compression coil springs 774 positioned in the bottom of the holes 771 engage the legs of the yokes 772 and bias the rollers into engagement with the main feed roll 502.

Referring to FIG. 29, the main feed roll 502 has a relatively large diameter central region 780 supported on a shaft 781. A pair of bearings 782 carried by the side plates 601, 602 journal the shaft 781. A timing belt pulley 783 is keyed to one end region of the shaft 781.

A groove 785 is formed in the central region 780. The light emitting diode 530 is carried on the gate bar 501 at a position opposite the groove 785. When no sheet of film is present between the gate bar 501 and the main feed roll 502, light emitted by the diode 530 enters the groove 785 and an insufficient amount of this light is reflected onto the diode 530 to trigger the diode. When a sheet of film is present between the gate bar 501 and the main feed roll 502, light emitted by the diode 530 is reflected by the film onto a light sensitive portion of the diode 530 causing the diode to trigger and provide a variation in an electrical signal indicating the presence of the film sheet.

The diode 530 is electrically connected to the solenoid valve (not shown) which supplies compressed air to the cylinders 760. When the diode 530 is triggered by the feeding of a film sheet between the gate bar 501 and the main feed roll 502, the cylinders 760 are operated to retract the piston rods 756, 757, thereby lowering the film support plate 435 to assure that no subsequent sheets of unexposed film are fed from the magazine 400.

Figure 30:
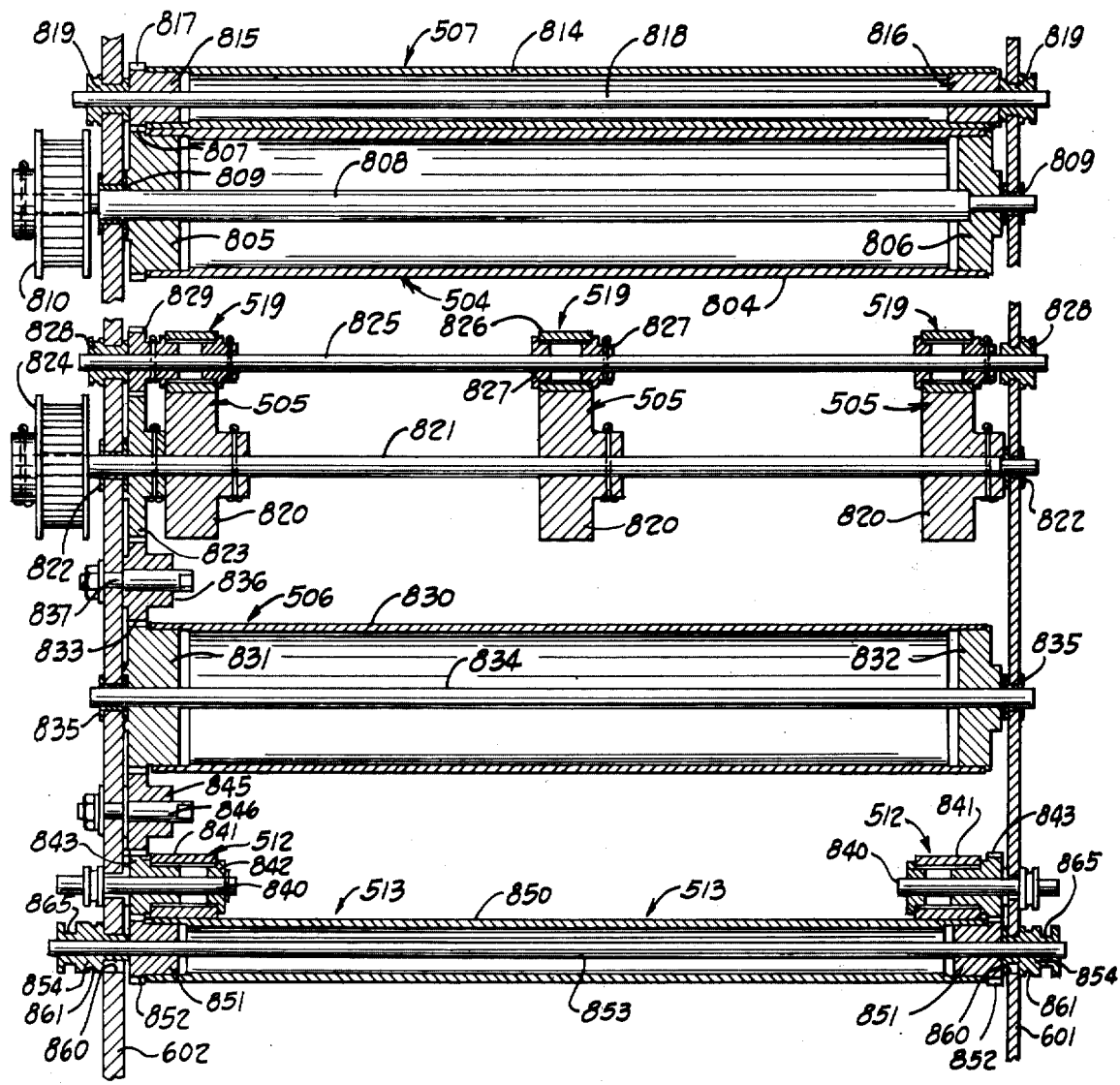
FIG. 30 is a sectional view as seen from the plane indicated by the broken line 30—30 in FIGS. 26 and 27.

Referring to FIG. 30, the structure of several of the rolls and rollers which are operative to feed a sheet of film along the path 503 is shown. The roll 504 includes a cylindrical tubular housing 804 supported at opposite ends on hubs 805, 806. The periphery of hub 805 has an integrally formed ring of gear teeth 807. The hubs 805, 806 are secured to a shaft 808. A pair of bearings 809 carried by the sidewalls 601, 602 journal the shaft 808. A timing belt pulley 810 is keyed to the shaft 807 to drive the roll 504.

The rolls 507 and 508 are of identical construction. Referring to FIG. 30, the roll 507 includes a cylindrical tubular housing 814 supported at opposite ends on hubs 815, 816. The periphery of the hub 815 has an integrally formed ring of gear teeth 817. The hubs 815, 816 are secured to a shaft 818. A pair of bushings 819 carried by the side plates 601, 602 journal the shaft 818. The gear teeth 817 are in meshing engagement with the gear teeth 807 formed on the hub 805. Both of the rolls 507, 508 are gear driven from the roll 504 in this manner.

The roll 505 is formed from three cylindrical roll segments 820 keyed to a shaft 821. A pair of bearings 822 carried by the side walls 601, 602, journal the shaft 821. A gear 823 and a timing belt pulley 824 are keyed to the shaft 821.

The rolls 509, 519 are of identical construction. Referring to FIG. 30, the roll 519 is formed from three roller assemblies secured to a shaft 825. These roller assemblies each include a tubular housing 826 supported at opposite ends by a pair of hubs 827. One of the hubs 827 on each of the roller assemblies is keyed to the shaft 825. A pair of bushings 828 carried by the side walls 601, 602 journal the shaft 825. A gear 829 is keyed to the shaft 825. The gear 829 has its teeth in meshing engagement with the gear 823. Both of the rolls 509, 519 are gear driven from the roll 505 in this fashion.

The roll 506 includes a tubular housing 830. A pair of hubs 831, 832 support opposite ends of the housing 830. The periphery of the hub 831 has an integrally formed ring of gear teeth 833. The hubs 831, 832 are supported on a shaft 834. A pair of bearings 835 carried by the side walls 601, 602 journal the shaft 834.

An idler gear 836 is carried on a stub shaft 837 at a position between the rolls 505, 506. The gear 836 has a teeth in meshing engagement with the gears 823, 833. The stub shaft 837 is carried by the side wall 602. By this arrangement, the roll 506 is gear driven from the roll 505.

The rolls 510, 511 are identical in construction to the rolls 507, 508 and will not be further described. The rolls 510, 511 are gear driven from the roll 506.

The upper pinch rolls 512 are carried on a pair of stub shafts 840. The stub shafts 840 are secured to the side plates 601, 602. The rolls 512 each include a tubular outer housing 841. A pair of hubs 842 are secured to the stub shaft 840 and support opposite ends of the housing 841. The periphery of one of the hubs 842 has an integrally formed ring of gear teeth 843.

An idler gear 845 is supported on a stub shaft 846 at a position between the rolls 506, 512. The gear 845 has a toothed periphery in driving engagement with the gears 833, 843. The stub shaft 846 is secured to the side member 602. By this arrangement, the left one of the pinch rolls 512 (as viewed in FIG. 30) is gear driven from the roll 506.

The lower pinch roll 513 includes a tubular housing 850. A pair of hubs 851 support opposite ends of the housing 850. Each of the hubs 851 has a toothed peripheral ring 852 in meshing engagement with the toothed peripheries 843 of the hubs 842. The hubs 851 are supported on a shaft 853.

A pair of bushings 854 are carried in slots 860 formed in the plates 601, 602. The bushings 854 journal the shaft 853. The bushing 854 are provided with shallow peripheral grooves 861 and with reduced diameter regions 865. A pair of springs (not shown) are received in the grooves 861 and bias the lower pinch roll 513 upwardly toward a position where the bushings 854 engage the upper ends of the slots 860.

The meshing engagement between the left upper pinch roll gear 843 (as viewed in FIG. 30) and the lower pinch roll gear 852 is operative to gear drive the lower pinch roll 513. The meshing engagement between the right upper pinch roll gear 843 and the lower pinch roll gear 852 is operative to gear drive the right upper pinch roll 512.

Referring to FIG. 26, a double-acting pneumatic cylinder is supported inside the side plate 602. The cylinder 870 has an extensible piston rod 871 which carries a bracket 872. A shaft 873 extends laterally between the side plate 601, 602 and is journaled by bearings (not shown) carried by the side plates 601, 602.

An L-shaped lever 874 is carried on one end region of the shaft 873. The L-shaped lever 874 has one leg pivotally connected to the bracket 872 by a pin 875. The other leg of the lever 874 is pivotally connected to a link 876 by a pin 877. The link 876 is pivotally connected to an actuating arm 877 by a pin 878. The lever 877 is slotted at 879 to receive the end region of one of the stub shafts 840. The lever 877 is also slotted at 880 to receive the reduced diameter portion 865 of one of the bushings 854. A rearwardly projecting tab 881 is formed integrally with the lever 877.

Referring to FIG. 22, a similar arrangement of an actuating arm 877, a link 876, and a lever 874 are provided on the opposite side of the film feed mechanism 500 adjacent the side plate 601. When the shaft 873 is rotated, the actuating arms 877 are raised and lowered in unison. Raising of the arms 877 is effected by an extension of the piston rod 871. Lowering of the actuating arms 877 is effected by a retraction of the piston rod 871.

The actuating arms 877 perform dual functions. When the arms 877 are in their fully lowered position, the slots 880 engage the reduced diameter portions 865 of the bushings 854 and move the lower feed roll 513 to a position where the bushings 854 engage the bottoms of the slots 860. When the arms 877 are at a position intermediate their upper and lowermost positions, the rearwardly projecting tabs 881 are positioned to engage the tabs 202a (FIG. 5) formed on the vacuum assembly backing plate 202. When the actuating arms 877 are in their fully elevated position, the rearwardly projecting tabs 881 are operative to engage and elevate the tabs 202a to open the vacuum evacuable assembly 200 to admit or discharge a sheet of film.

Referring to FIG. 26, a reversible drive motor 900 is provided for reversibly driving the several described feed rolls. The motor 900 has an output shaft 901 which carries a timing belt pulley 902. A timing belt 903 is reeved around the timing belt pulley 902. From the pulley 902, the belt 903 is reeved around an idler pulley 904 carried by the side plate 602 and around the timing belt pulleys 783, 810, and 824. By this arrangement, the motor 900 is operative to concurrently drive the feed rolls 502, 504, 505, 506, 507, 508, 509, 510, 511, 519, and the pinch rolls 512, 513.

Referring to FIG. 26, the guide bars 515, 516 are curved metal plates disposed respectively between the rolls 507, 508 and 510, 511. The curved guide bars 515, 516 extend laterally between the side plates 601, 602 and are secured at opposite ends to the side plates 601, 602.

Referring to FIGS. 22 and 26, the guide bar 520 is a curved metal plate supported along its lower side by a shaft 920. The shaft 920 extends laterally between the side plates 601, 602 and has opposite ends journaled by the side plate 601, 602 for rotation. A lever 921 is secured to the end of the shaft 920 adjacent the side plate 601.

Referring to FIG. 22, a double-acting pneumatic cylinder 925 is provided for pivoting the lever 921. The cylinder 925 has a housing, the upper end region of which is pivotally secured to the side plate 601 by a pin 926. The cylinder 925 has an extensible piston rod 927. A bracket 928 is carried on the piston rod 927. A pin 929 pivotally connects the bracket 928 and the lever 921.

When the piston rod 927 is extended, the lever 921 pivots the guide bar 520 to the position shown in phantom in FIG. 21 for guiding a sheet of film preceding along the path 518 from the region of the roll 509 to the vicinity roll 519 for feeding between the roll 519 and the roll 505. When the piston rod 927 is retracted, as shown in FIG. 22, the guide bar 520 is pivoted upwardly to a position where it will not interfere with the feeding of film along the path 503.

Feeding of a sheet of film from the unexposed magazine 400 along the path 503 does not begin until the piston rod 927 of the cylinder 925 is retracted to pivot the guide bar 520 to its upwardly out-of-the-way position, and until the piston rod 871 of the cylinder 870 is extended to raise the lower pinch roll 513 and to open the vacuum evacuable assembly 200.

As the film sheet, being fed from the unexposed film magazine 400, leaves the magazine 400 and passes from between the gate bar 501 and the feed roll 502, the diode 530 carried on the gate bar 501 provides a signal. This signal is used, as will subsequently be described to effect a retraction and closing of the magazines 400, 450.

As the film being fed to the vacuum evacuable assembly 200 passes the light emitting diode 532 (FIG. 21), the light emitting diode provides a variation in an electrical signal which operates a solenoid valve (not shown) that supplies air under pressure to the pneumatic cylinder 870 (FIG. 26). The piston rod 871 of the cylinder 870 then retracts, lowering the arms 877 to close the vacuum evacuable assembly 200 and to move the lower pinch roll 513 downwardly to a position where the lip 201a of the film sheet 201 is released by the pinch rolls 512, 513. Once the pinch rolls 512, 513 release their grip on the film sheet 201, the vacuum evacuable assembly 200 may be driven to an exposure station for exposing the film sheet 201 as described.

XIII. Feeding of an Exposed Film Sheet

When the film sheet 201 has been exposed, the vacuum evacuable assembly 200 returns the film sheet 201 to a position where the lip 201a of the film sheet projects between the separated pinch rolls 512, 513. When the light emitting diode 533 senses the return of the lip 201a, an exposed film feed signal is generated which is utilized to initiate the performance of several operations.

One of the operations initiated by the exposed film feed signal is the extension of the piston rod 871 to raise the actuating arms 877. As the arms 877 are raised, the lower pinch roll 513 is brought into engagement with the lip 201a of the exposed film sheet 201, and the vacuum evacuable film assembly 200 is opened. When the assembly 200 is open, the motor 900 is then actuated to drive the various feed rolls to effect feeding of the film sheet 201 along the path 518.

Another operation initiated by the exposed film feed signal is the extension of the piston rod 927 to pivot the guide bar 520 to its downward position as shown in phantom in FIG. 21.

Still another operation initiated by the exposed film feed signal is the extension of the magazines 400, 450. The same sequence as described above is followed during extension of the magazines. The covers of both magazines 400, 450 are opened and the magazines 400, 450 are moved to the positions shown in solid lines in FIG. 21.

From the earlier discussion of the magazine unlatching, opening and extension mechanism 600, it will be recalled that the cylinders 625 and 720 are operative to respectively move the bars 617, 717 along the guide rods 621 to effect a part of the magazine unlatching, opening and extension sequence. The movement of the bars 617, 717 is also responsible for effecting other operations during the feeding of film sheets along the paths 503, 518, and these additional functions will now be described.

Referring to FIGS. 24 and 27, the bar 717 carries a pair of hooks 950. When the bar 717 moves rightwardly as viewed in these Figures, the hooks 950 extend to a position forwardly of the feed roll 505. The purpose of the hooks 950 is to effect positive feeding of the trailing edge of a sheet of exposed film into the exposed film magazine 450. Accordingly, as a part of the magazine extension sequence which takes place before a sheet of exposed film is fed out of the vacuum assembly 200, the hooks 950 are extended by rightward movement of the bar 717.

The hooks 950 remain extended until the trailing edge of a sheet of exposed film being fed into the magazine 450 passes the diode 534. The diode 534 then signals the cylinder 720 to retract the hooks 950 to pull the trailing film edge ino the magazine 450.

XIV. Magazine Retraction

As has been explained, the magazines 400, 450 retract both after a sheet of unexposed film has been fed out of the unexposed film magazine 400, and after a sheet of exposed film has been fed into the exposed film magazine 450. Magazine retraction is effected by the cylinder 625 moving the bar 617 leftwardly as viewed in FIG. 24.

At the onset of this retraction movement, a mechanism indicated generally by the numeral 975 in FIG. 24 operates to assure that all of the unexposed film sheets in the magazine 400 are properly positioned to permit closure of the magazine cover 410.

Referring to FIGS. 24 and 27, the mechanism 975 includes a bar 976 which extends laterally between the side plates 601, 602. A pair of bushings 977, 978 are carried by opposite end regions of the bar 976. The bushings 977, 978 slidably journal the guide rods 621 to mount the bar 976 for movement along the guide rods 621. A pair of compression coil springs 979 carried on the guide rods 621 engage the bushings 977, 978 and bias the bar 976 rightwardly toward a position where the bushings 977, 978 engage the brackets 622.

An upwardly projecting finger 980 is carried on the central portion of the bar 976. The finger 980 projects into the gate bar recess 770 (FIG. 29). When the unexposed film magazine 400 is in its extended position, as shown in solid lines in FIG. 21, the sheets of unexposed film in the magazine 400 abut both the gate bar 501 and the finger 980.

The bar 617 carries an arm 985. A hook-shaped latching member 986, is pivotally carried on the arm 985 for movement about a vertical axis 987. A stop 988 is formed on the latching member 986. A torsion spring 989 biases the latching member clockwise, as viewed in FIG. 24, toward a position where the stop 988 engages the side of the arm 985. A latch-strike 990 is carried on the bar 976. When the bar 617 moves rightwardly to extend the magazines 400, 450, the hook-shaped latching member 986 engages and hooks around the strike 900.

When the magazines 400, 450 begin to retract, the leftward movement of the bar 617 pulls the bar 976 leftwardly along the guide rods 621. As the bar 976 moves leftwardly, the finger 980 engages the forward edges of the unexposed film sheets positioned in the magazine 400 and assures that they move leftwardly with the magazine 400.

Leftward movement of the bar 976 is terminated before the magazines 400, 450 are fully retracted. A trigger 995 is carried on one of the cross-members 603. The trigger 995 is positioned to engage a projection 996 formed on the latching member 986. When the trigger 995 engages the projection 996, continued leftward movement of the bar 617 will cause the latching member 986 to pivot counterclockwise, releasing the strike 990. The bar 976 then returns to its extended position under the influence of the springs 979.

Magazine retraction during feeding of an unexposed film sheet along the path 503 is initiated when the trailing edge of the film sheet passes the gate bar diode 530. Magazine retraction after feeding of an exposed film sheet into the magazine 450 is initiated when the arm 710 which is operated by the cylinder 720 (FIG. 24) engages and actuates the switch 730.

XV. The Film Identification System 1000

Figure 31:
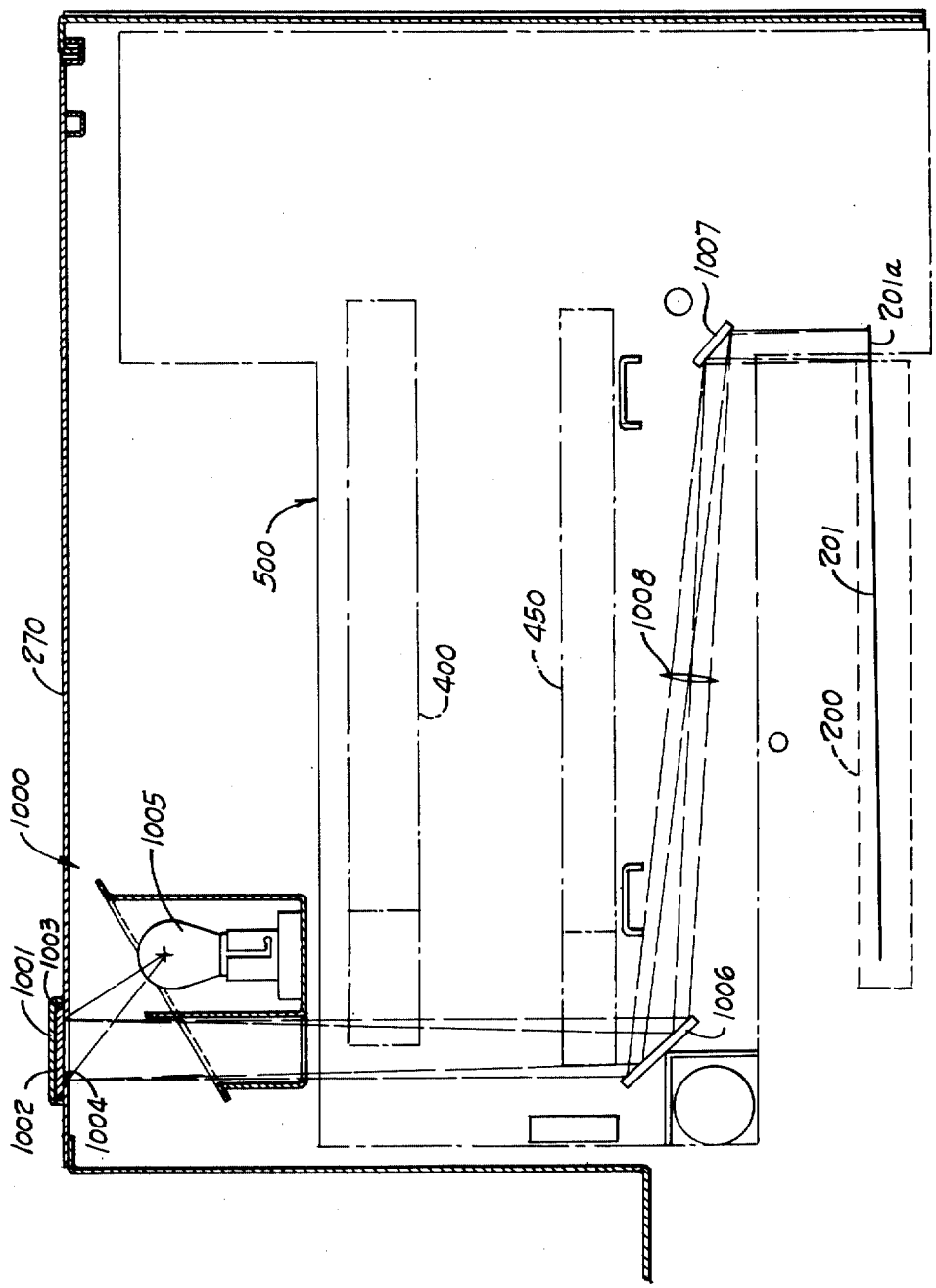
FIG. 31 is a side elevational view similar to FIGS. 22 and 27 showing certain other details of the apparatus of FIG. 1.

Referring to FIG. 31, a film identification system, indicated generally by the numeral 1000, is provided for forming an identification image on the lip 201a of a film sheet carried in the vacuum evacuable assembly 200.

The identification system includes a cover plate 1001 carried atop the upper housing 270, as shown in FIGS. 1, 11 and 31. The cover plate 1001 defines a passageway 1003 for receiving an image bearing indicia card 102.

An opening 1004 is formed through the upper housing 270 beneath the cover plate 1001. An identification image formed on the underside of the card 1002 is visible from inside the housing 270 through the opening 1004.

A light source 1005 is provided within the upper housing 270. Light from the source 1005 illuminates the image formed on the card 1002. A switch (not shown) is provided for energizing the light source 1005 for a brief predetermined period of time after a sheet of film 201 has been fed into the assembly 200 and after the assembly 200 has been closed.

A pair of mirrors 1006, 1007 are carried by the film feed mechanism 500. A lens 1008 is positioned between the mirrors 1006, 1007. The optical system of mirrors 1006, 1007 and the lens 1008 is operative to form an image of the card 1002 on the film lip 201a when the light source 1005 is illuminated.

As will be apparent, the film identification system 1000 provides a simple means of identifying film sheets by exposing an image of a patient's name or other identification data on the film sheets.

XVI. Conclusion

As will now be apparent, the spot filmer 50 provides a fully automatic system for feeding unexposed sheet film from an unexposed film magazine to a vacuum evacuable film assembly where the film sheet is identified and exposed. The exposed film sheet is then fed automatically to a exposed film magazine. The feeding operations are effected in rapid sequence permitting the rapied sequence exposure of a series of radiographs.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. An X-ray spot filmer, comprising:
   a. a housing structure defining a chamber and having an opening formed through said structure communicating with said chamber;
   b. a film feed mechanism positioned within said chamber for feeding film sheets from a magazine station to an exposure station;
   c. a film magazine insertable through said opening into said film feed mechanism; and,
   d. power driven means carried within said chamber for drivingly engaging said magazine as said magazine is inserted for drawing said magazine inwardly along a path toward said magazine station.
2. The apparatus of claim 1 wherein said power driven means includes:
   a. structure defining a trackway located inwardly of said opening;
   b. slide means carried in said trackway for drivingly engaging said magazine as said magazine is inserted into said opening; and,
   c. slide drive means connected to said slide means for moving said slide means along sad trackway to draw said magazine through said opening and position said magazine in said inserted position.
3. The apparatus of claim 2 additionally including sensor means for sensing the insertion of said magazine into said opening and for operating said slide drive means to draw said magazine through said opening.
4. The apparatus of claim 2 wherein said magazine and said slide are provided with mating structures which are operable to releasably establish a driving connection between said magazine and said slide as said magazine is inserted into said opening.
5. The apparatus of claim 4 wherein said mating structures include a recess formed in said magazine and a spring-biased detent pin carried by said slide for extension into said recess when said magazine is inserted into said opening.
6. The apparatus of claim 5 wherein:
   a. said recess is an elongated recess extending transversely to the path of travel followed by said magazine during insertion into said opening;
   b. said pin is operable to engage said elongated recess near one end region thereof as said magazine is inserted into said opening; and,
   c. whereby, after said magazine is in said inserted position, said magazine can be moved transversely relative to said detent pin and said detent pin will remain in said elongated recess during such transverse magazine movement.
7. The apparatus of claim 1 wherein:
   a. an additional opening is formed through said housing structure in communication with said chamber;
   b. an additional film magazine is insertable through said additional opening into said film feed mechanism; and,
   c. an additional slide drive means is carried in said chamber for drivingly engaging said additional magazine as said additional magazine is inserted into said additional opening for drawing said additional magazine inwardly to an additional inserted position.
8. The apparatus of claim 7 additionally including sensor means for sensing when said magazine and said additional magazine are in said inserted and said additional inserted positions.
9. The apparatus of claim 1 wherein said power driven means includes a fluid operated cylinder.
10. The apparatus of claim 2 wherein said power driven means additionally includes bi-directional power drive means connected to said slide for moving said slide in opposite directions along said trackway.

11. The apparatus of claim 10 including switch means operable from outside said housing for operating said power drive means to eject said magazine from said feed mechanism.

12. The apparatus of claim 1 additionally including door means movably carried by said housing structure for opening and closing said opening.

13. The apparatus of claim 12 wherein said door means includes a door movably carried by said housing for movement in directions transverse to the path of movement followed by said magazine during insertion into said opening.

14. The apparatus of claim 13 wherein an aperture is formed through said door and said door is movable to bring said aperture into and out of alignment with said opening to open and close said opening.

15. The apparatus of claim 12 additionally including door drive means for moving said door to open and close said opening.

16. The apparatus of claim 15 additionally including switch means accessible from outside said housing structure for operating said power driven means and said drive means at a time when said magazine is in said inserted position to open said door means and to eject said magazine through said opening.

17. An X-ray spot filmer, comprising:
   a. a housing structure defining a chamber and having an opening formed therethrough communicating with said chamber;
   b. a film positioning assembly movably supported within said chamber for movement between a loading position and an exposure station;
   c. drive means carried within said chamber for moving said film positioning assembly between said loading position and said exposure station;
   d. film feed means for feeding a sheet of film along a feed path into said assembly and for feeding a sheet of film out of said assembly when said assembly is in said loading position; and,
   e. support means supporting said film feed means for movement as a unit through said opening for insertion into and withdrawal from said housing structure.

18. The apparatus of claim 17 wherein said extensible support means include a pair of roller slides secured to said housing structure and connected to opposite sides of said film feed means.

19. An X-ray spot filmer, comprising:
   a. a housing structure defining a chamber and having an opening formed therethrough communicating with said chamber;
   b. positioning means movably supported within said chamber for positioning a sheet of film in an exposure station;
   c. a film magazine;
   d. film feed means carried in said chamber for receiving said magazine and for feeding a sheet of film along a path extending between said magazine and said positioning means;
   e. said magazine including:
      i. a top wall and a bottom wall;
      ii. a pair of side walls and a rear wall interconnecting said top and bottom wall;
      iii. a cover movable in sequence from a closed, latched position to an unlatched position and then to an open position; and,
      iv. unlatching means movably engageable with said cover to move said cover from said closed, latched position to said unlatched position.

20. The apparatus of claim 19 wherein said magazine additionally includes biasing means operative when said cover is in said unlatched position to bias said cover toward said closed, latched position.

21. The apparatus of claim 19 wherein said unlatching members include a pair of arms carried in trackways formed in said sidewalls, said arms being movable along said trackways to engage and move said cover from said closed, latched position to said unlatched position.

22. The apparatus of claim 19 wherein said cover is pivotally and slidably mounted on said sidewalls for translatory movement in moving from said closed, latched position to said unlatched position, and for pivotal movement in moving from said unlatched position to said open position.

23. An X-ray spot filmer comprising:
   a. a housing structure defining a chamber and having an opening formed therethrough communicating with said chamber;
   b. positioning means movably supported within said chamber for positioning a sheet of film in an exposure station;
   c. a film magazine;
   d. film feed means carried in said chamber for receiving said magazine and for feeding film along a path extending between said magazine and said positioning means;
   e. said magazine including:
      i. structure defining an enclosure including one side having an opening;
      ii. a cover slidably carried by said structure for movement along a cover path between open and closed positions to open and close said opening;
      iii. latching means for latching said cover in its closed position including at least one member movable laterally of said path between first and second positions;
      iv. said member being operable when in said first position to prevent the movement of said cover along said cover path from said closed position;
      v. said member being operable when in said second position to permit the movement of said cover along said cover path; and,
      iv. biasing means biasing said member toward said first position.

24. The apparatus of claim 23 wherein said film feed means is operable to move said member from said first position to said second position when said magazine is inserted into said film feed mechanism.

25. An X-ray spot filmer, comprising:
   a. a housing defining a chamber and having an opening formed therethrough communicating with said chamber;
   b. positioning means movably supported within said chamber for positioning a sheet of film in an exposure station;
   c. a film magazine;
   d. film feed means positioned within said chamber for moving said magazine from a retracted position to an extended position and for feeding film along a path extending between said magazine and said positioning means;
   e. said magazine including:

i. structure defining an enclosure open along one side and otherwise light-tight;
ii. a cover movably carried for opening and closing said one side;
iii. a film support plate movably carried within said enclosure for supporting a plurality of sheets of film in a stack within the enclosure;
f. said film feed means including actuator means for moving said film plate to position such stack of film sheets in position for feeding; and,
g. mating formations carried on said support plate and said actuator means, said mating formations being engageable one with another when said magazine is moved from said retracted position to said extended position.

26. The apparatus of claim 25 wherein said mating formations include a pair of spaced projections carried by said actuator means and a pair of slotted arms carried on opposite sides of said support plate.

27. The apparatus of claim 26 wherein said actuator means additionally includes fluid-operated cylinder means for moving said projections to position said support plate.

28. The apparatus of claim 27 wherein said actuator means includes a pair of double acting pneumatic cylinders for moving said projections.

29. An X-ray spot filmer, comprising:
a. a housing structure defining a chamber and having an opening formed therethrough communicating with said chamber;
b. a film magazine insertable through said opening and into said chamber, said magazine including a structure defining a light-tight enclosure open along one side and having a movable cover for opening and closing said open side;
c. film feed means positioned within said housing for feeding a sheet of film along a path extending between said magazine and an exposure position;
d. said film feed mechanism including:
i. structure for receiving said magazine as said magazine is inserted through said opening and defining a fully inserted position for said magazine;
ii. guide means engageable with said magazine as said magazine is inserted through said opening to guide the movement of said magazine along an insertion path;
iii. cover unlatching and opening means engageable with said magazine after said magazine is positioned in said fully inserted position to unlatch and open said magazine cover.

30. The apparatus of claim 29 wherein said guide means is movable in a direction laterally of said path after said magazine is in said fully inserted position to move said magazine to an extended position.

31. The apparatus of claim 29 wherein said cover unlatching and opening means includes a pointed member engageable with an aperture in said cover as said magazine is moved along said path toward said fully inserted position.

32. An X-ray spot filmer comprising:
a. a housing structure;
b. a film feed mechanism positioned within said housing structure;
c. a film magazine carried by said film feed mechanism for presenting a stack of film sheets to said film feed mechanism;
d. the film feed mechansim being operable to feed a sheet of film from said magazine along a feed path to an exposure station; and including:
i. a feed roll;
ii. a gate positioned near said feed roll for blocking the movement of all but one of the film sheets in said stack of film sheets from feeding between said feed roll and said gate;
iii. a member movably carried by said mechanism and being biased to a position near said gate;
e. said member being operable subsequent to the feeding of said film sheet to move away from said gate and engage the leading edges of the film sheets in said stack to align said film sheets.

33. The apparatus of claim 32 additionally including magazine positioning means for moving said unexposed film magazine between an extended position where the leading edges of said stack of film sheets engage said gate bar and a retracted position wherein said leading edges are out of engagement with said gate bar, said member being releasably connected to said magazine positioning means for initial movement together with said magazine as said magazine moves from said extended position to said retracted position.

34. The apparatus of claim 33 additionally including latch means releasably connecting said member and said magazine positioning means, said latch means being operable to release said member from said magazine positioning means when said magazine has moved part of the way toward said retracted position from said extended position.

35. The apparatus of claim 34 wherein said latch means is operable to releasably connect said member and said magazine positioning means when said magazine is in said extended position.

36. An X-ray spot filmer comprising:
a. a housing structure;
b. a film feed mechanism positioned within said housing structure;
c. an exposed film magazine carried by said film feed mechanism;
d. said film feed mechanism being operable to feed a sheet of exposed film from an exposure station into said exposed film magazine;
e. said film feed mechanism including a plurality of feed rolls defining a feed path for moving said exposed film from said exposure station to said exposed film magazine, and a member movable along the feed path defined by said rolls to engage a trailing edge of a film sheet being fed into said exposed film magazine to assure that trailing film portions of said film sheet are fed into said exposed film magazine.

37. The apparatus of claim 36 additionally including actuator means for moving said member along said feed path to feed trailing film sheet portions into said exposed film magazine.

38. The apparatus of claim 37 wherein said member is carried on a bar slidably mounted on a pair of guide rods paralleling said film path.

39. The apparatus of claim 36 additionally including a resilient roll positioned beside said exposed film magazine for guiding the movement of said exposed film sheet into said exposed film magazine.

40. An X-ray spot filmer comprising:
a. a housing structure;
b. film feed means positioned within said housing structure;

c. a film positioning assembly movably carried within said housing structure, said assembly being operable to receive a sheet of film from said film feed means while said assembly is in a loading position, said assembly being closable to grip said film sheet, said assembly being movable to position said film sheet in an exposure station for exposure and to return the exposed film sheet to said loading position;

d. said film feed means including a pair of pinch rolls positioned near said assembly when said assembly is in said loading position and being operative to feed a sheet of film into said assembly except for a marginal lip portion of such film sheet which is retained between said pinch rolls; and, e. means for selectively concurrently opening said assembly and moving said pinch rolls together to grip said film lip, and for concurrently closing said assembly and moving said pinch rolls apart to release the grip of said pinch rolls on said film lip.

41. The apparatus of claim 40 wherein said means includes a pair of arms for engaging opposite side portions of the film assembly and to move said portions to selectively open and close the film assembly.

42. The apparatus of claim 41 wherein said arms are also operative to engage one of said pinch rolls and to move said one pinch roll relative to the other of said pinch rolls to selectively grip and release said film lip.

43. An X-ray spot filmer comprising:
a. a housing forming an enclosure;
b. positioning means movably carried within said enclosure for receiving a sheet of film and moving said film sheet between a retracted position and an exposure position;
c. a film magazine means removably carried within said enclosure;
d. a film feed mechanism positioned within said enclosure for feeding a sheet of film between said magazine means and said positioning means;
e. said film feed mechanism comprising a self-contained unit including;
 i. a pair of side members;
 ii. a plurality of cross members extending between and secured to said members to form a rigid framework;
 iii. a plurality of film feed rolls supported between said side members and defining a path of movement for moving a film sheet between said magazine means and said positioning means;
 iv. reversible drive means for driving said film feed rolls to feed a film sheet along said path;
 v. said rolls including a pair of pinch rolls, one of said pinch rolls being movably carried by said side members to permit relative movement of said pinch rolls into and out of gripper engagement with a film sheet being fed along said film path;
 vi. actuator means engageable with opposite end regions of said one pinch roll for relatively moving said pinch rolls toward and away from each other; and,
 vii. said actuator means including a pair of roll positioning members carried on said side members and a common actuator for moving said positioning members in unison to move opposite end regions of said one pinch roll toward and away from the other pinch roll.

* * * * *